Feb. 5, 1957  J. W. DODSWORTH  2,780,407
CARRIAGE CONTROL MEANS FOR LISTING CALCULATORS
Filed Feb. 23, 1955  10 Sheets-Sheet 1

INVENTOR
JAMES W. DODSWORTH
BY
AGENT

Feb. 5, 1957  J. W. DODSWORTH  2,780,407
CARRIAGE CONTROL MEANS FOR LISTING CALCULATORS
Filed Feb. 23, 1955  10 Sheets-Sheet 2

INVENTOR
JAMES W. DODSWORTH
BY
AGENT

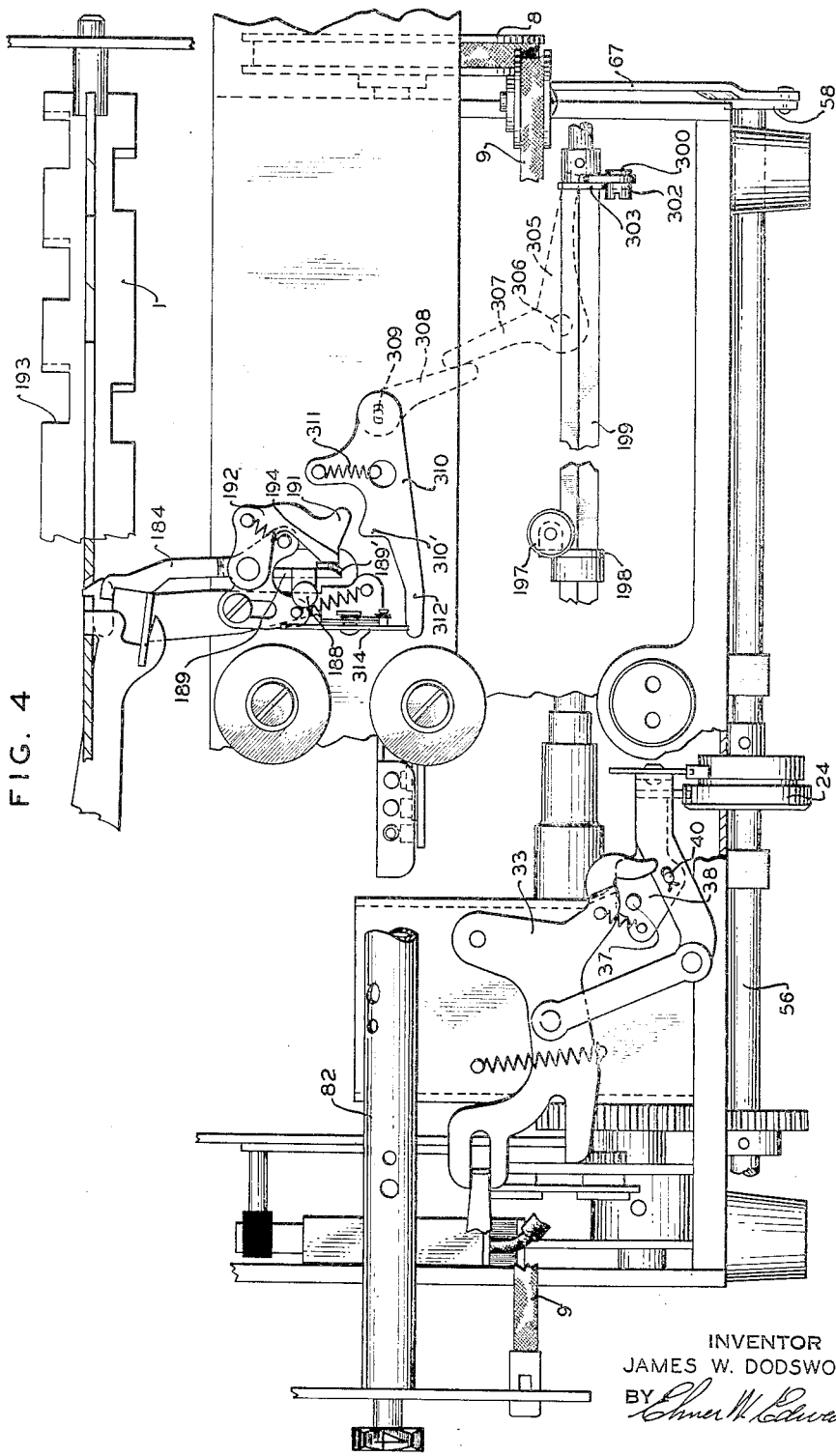

Feb. 5, 1957 J. W. DODSWORTH 2,780,407
CARRIAGE CONTROL MEANS FOR LISTING CALCULATORS
Filed Feb. 23, 1955 10 Sheets-Sheet 5
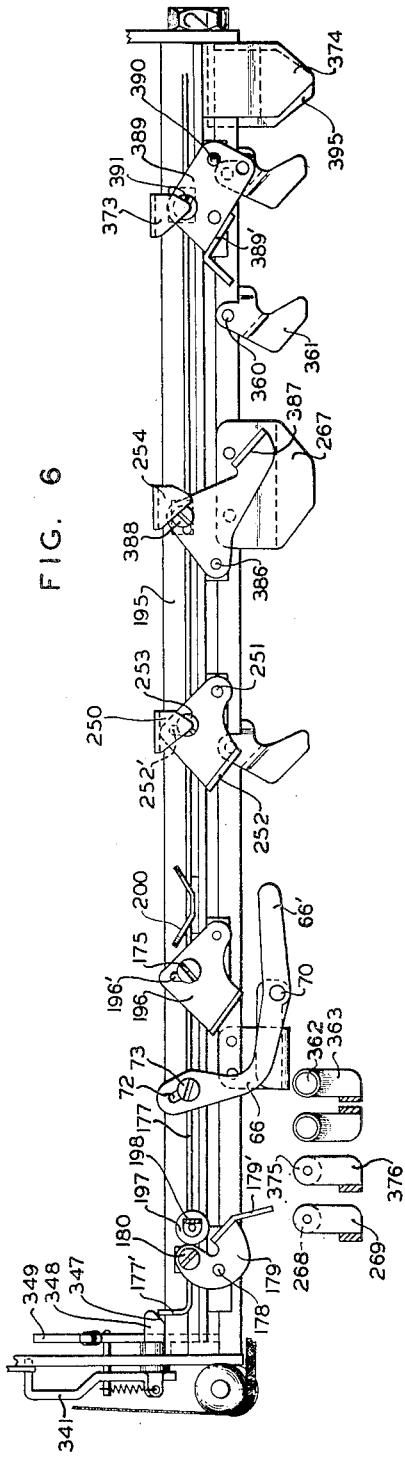
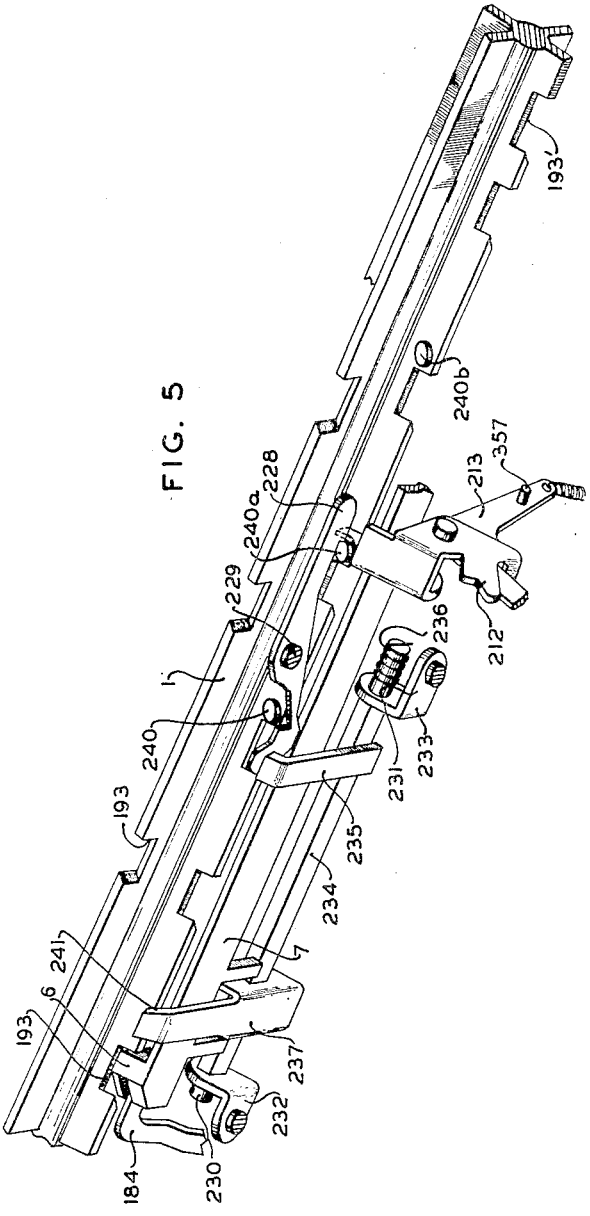
INVENTOR
JAMES W. DODSWORTH
BY Elmer W. Edwards
AGENT

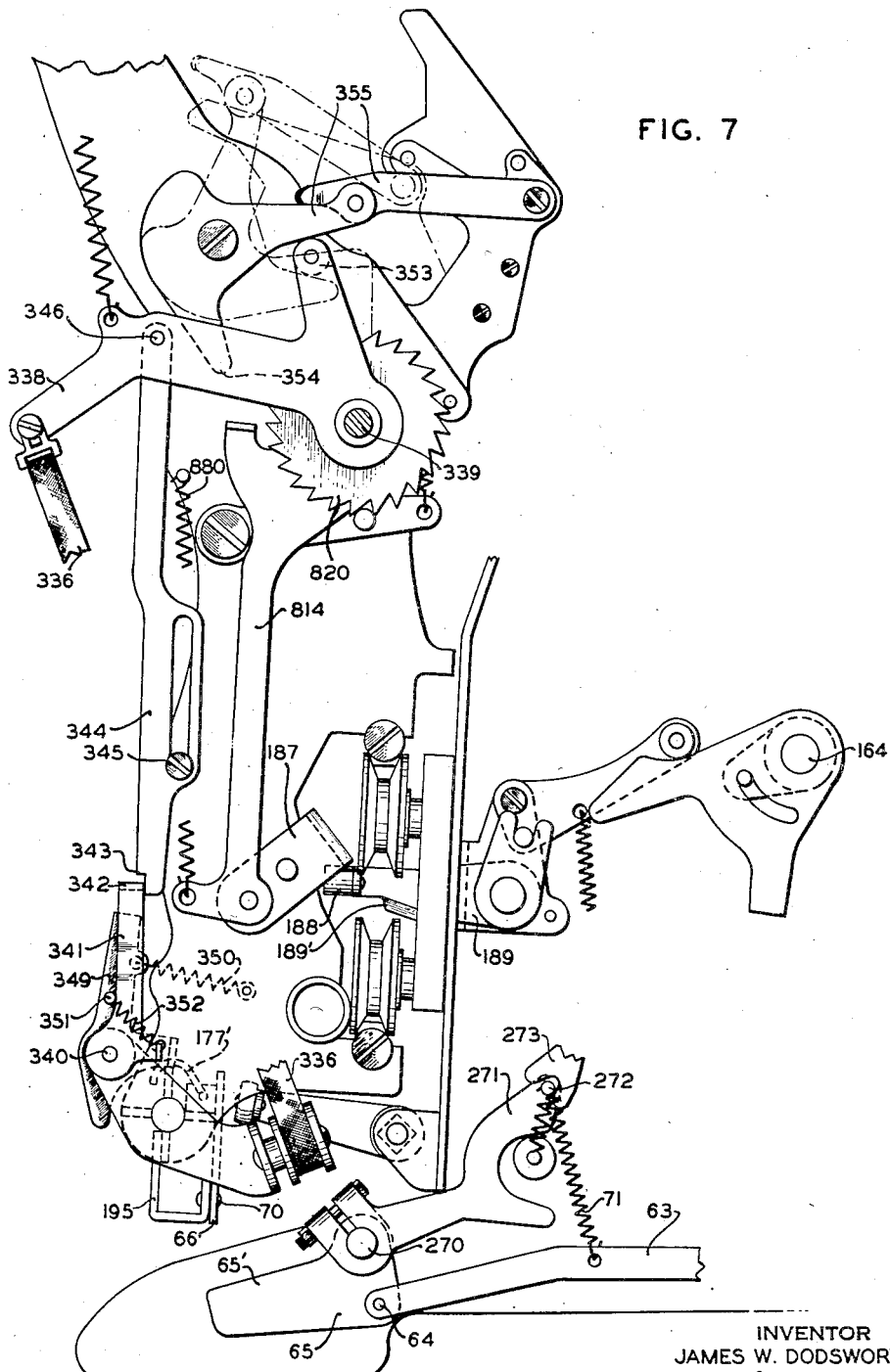

INVENTOR
JAMES W. DODSWORTH
BY
AGENT

INVENTOR
JAMES W. DODSWORTH
BY Elmer W. Edwards
AGENT

Feb. 5, 1957　　　J. W. DODSWORTH　　　2,780,407
CARRIAGE CONTROL MEANS FOR LISTING CALCULATORS
Filed Feb. 23, 1955　　　　　　　　　　　　10 Sheets-Sheet 9

INVENTOR
JAMES W. DODSWORTH
BY
AGENT

Feb. 5, 1957  J. W. DODSWORTH  2,780,407
CARRIAGE CONTROL MEANS FOR LISTING CALCULATORS
Filed Feb. 23, 1955  10 Sheets-Sheet 10

INVENTOR
JAMES W. DODSWORTH
BY Elmer W. Edwards
AGENT

United States Patent Office 2,780,407
Patented Feb. 5, 1957

2,780,407

CARRIAGE CONTROL MEANS FOR LISTING CALCULATORS

James W. Dodsworth, Mount Tabor, N. J., assignor to Monroe Calculating Machine Company, Orange, N. J., a corporation of Delaware Application February 23, 1955, Serial No. 489,960

24 Claims. (Cl. 235—60.46)

This invention relates to improved means for controlling operations of the usual shiftable platen carriage of a listing calculator, whereby data entered into the machine, and the results obtained by calculations performed thereby, are caused to be printed in certain advantageous manner upon columnar form sheets.

One type of work to which the present invention is particularly adapted is that of well-known bank posting routines wherein certain entries, such as deposit checks drawn on foreign exchange banks, are entered in the deposit column of a customer's statement form but it is desired, however, that the crediting of such amounts to the customer's account be delayed until after such checks have been cleared through banking channels. For such entries a "Delay Credit" column is provided, for convenience upon a detachable portion of the customer's statement form sheet, following the "New Balance" total column of said form sheet. The "New Balance" column being the terminal posting operation column of a series of posting operations prior to the return of the record carriage to its initial starting position.

Posting routines involving a pick up of an old balance, the entry of one or more checks comprising debit items drawn against the account by the customer, and credit entries, including checks deposited with the bank for collection which may require an entry for certain charges in a special column following the "New Balance" printing entry on the form sheet are well known. In performing such a posting routine special control devices have been used heretofore to effect an automatic return movement of the record carriage selectively from either the "New Balance" column or from the subsequent special entry column to the initial starting columnar position in accordance with the character of operations as performed with the carriage in a columnar position which precedes and is nonadjacent to the said special entry column.

The present invention, however, contemplates the provision of control means for effecting a posting routine which requires certain special entries to be made in alternate columns, involving tabulating and return shuttle movements of the record carriage between one column of the form sheet which precedes an automatic terminal entry column and a second column on the form sheet which is past the said automatic terminal entry columnar position of the carriage, and from which terminal entry position automatic return movement of the carriage is eventually made to a columnar position preceding the first columnar position in which said amounts related to the special entries are to be made.

One object of the invention therefore is the provision of improved means for effecting posting routine operations which require normal deposit account entries following which an automatic return of the record carriage is to be effected from a terminal posting (New Balance) columnar position to the initial starting or "Old Balance" columnar position, and which routines may involve also multiple special entry operations in a columnar position (Deposit) occurring prior to the tabulated position of the terminal posting (New Balance) column and for which said special entries multiple related entries are to be made alternately therewith in a special (Delay Credit) column in a skip tabulated position past the said terminal posting (New Balance) columnar position.

Another object of the invention is the provision of an improved carriage stop control means adapted for normally interrupting return shuttle movements of the carriage relative to the special (Deposit) entry columnar position and wherein said stop is caused to be automatically disabled by power means operable under control of the carriage when said carriage is in the terminal operation columnar position.

Means are also provided for selectively effecting a final special entry operation whereby a return shuttle movement of the carriage will now be interrupted in the terminal posting column to effect an automatic New Balance total operation and to disable also the means normally adapted for interrupting a return movement of the carriage relative to the said first special entry column, whereby the carriage is thereafter free to return to its initial starting position.

Novel means are provided to prevent an operation of certain front feed carriage opening devices until after the terminal operation is effected.

Another object is the provision of means whereby a disabling of the selective column carriage return stop means by the said power devices operable in the said terminal operations columnar position of the carriage will also render effective the means for opening the front feed devices of the record carriage.

With the foregoing and other objects and advantages the invention includes the novel construction and combination of parts, the essential elements of which are set forth in the appended claims and a preferred embodiment of which is hereinafter described with reference to the drawings which accompany and form a part of this specification.

In the drawings:

Fig. 4 is a rear elevation showing the register selection clutch operating devices and the carriage tabulating means;

Fig. 5 is a front perspective view of a portion of the platen carriage locating means showing part of the notched tabulator bar and the means for controlling the reengagement of the locating means with said bar;

Fig. 6 is a front view of a transverse bar mounted within the carriage and supporting cam shoes for controlling various machine and carriage operations;

Fig. 7 is a left side elevation of the platen carriage, and rear portion of the machine;

Figure 12:
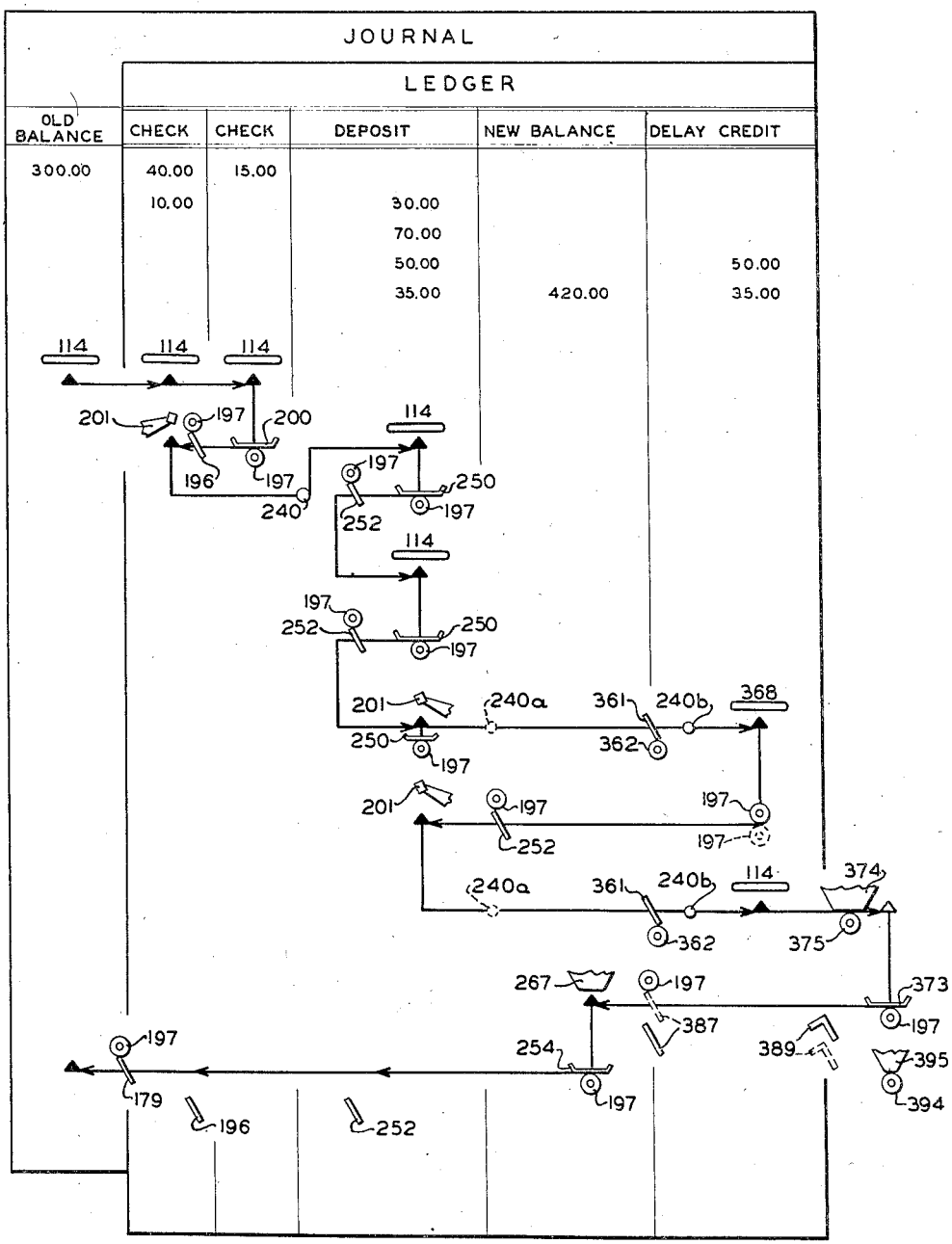

Fig. 12 similarly illustrates a special example of work for which the machine is adapted.

General structure

The adding listing machine to which the invention is shown as applied is of well-known type illustrated in U. S. Patent 1,946,572, issued on February 13, 1934, to Loring P. Crosman, and entitled "Listing Calculator" and as modified by Patent 1,994,211, issued on March 12, 1935, to the same inventor, and Patent 2,570,931, issued on October 9, 1951, to Howard M. Fleming, and entitled "Printing Tabulating Mechanism." It will be sufficient to describe the machine proper very generally and to say that for each denominational order the machine is provided with a three-armed differential actuator lever numbered 610 (Fig. 1), loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys 215 are depressible to represent a value and when depressed are latched in position with the bottom of their stems lying in the path of movement of the related stop lugs of the bars 615, and allow such bars to advance a distance proportionate to the value of the depressed key, upon operation of the machine.

A rock shaft 301 is provided with cam means 318 for governing the movement of a spring tensioned rocker frame 616, carrying a series of dogs 617, normally engaged by studs 659 of the levers 610. As shaft 301 is rotated forwardly (counterclockwise, Fig. 1) frame 616 will be rocked about shaft 608, and any of the levers 610 which have been released by depression of digit keys 215 will be allowed to rotate under the influence of their springs 683, until they are stopped by the lugs of bars 615, contacting with the stems of the keys. Upon rearward (return) rotation of shaft 301, the dogs 617 will return the operated levers 610 to normal position. This excursion of levers 610 serves to register amounts set in the keyboard upon one or more accumulators and to set up a similar amount on the printing line of the type bars.

Shaft 301 is oscillated by an electric motor 100, connected through suitable gearing and clutch means, with a crank arm 105 (Fig. 2) connected by a rod 108 to an arm 316, fast upon shaft 301, so that as crank arm 105 is rotated, shaft 301 will be oscillated.

Motor operation is controlled by motor bars or keys through a clutch lever 106 which is provided with a roller adapted to close contact members 110 in the motor circuit after lever 106 is moved out of restraining engagement with the spring operated clutch. A spring 111 tends to pull lever 106 away from the clutch, the lever being normally held in clutch engaging position by means of a latch 112. Latch 112 is controlled by a trigger 113, lying in the path of movement of a lever arm 114' connected with an operating key 114. Upon depression of key 114, trigger 113 is rocked clockwise to release latch 112 and clutch lever 106 will be pulled out of engagement with the clutch to start the machine in operation.

Upon release of key 114, latch 112 will return under spring action into latching position and, toward the end of the cycle of operation, an arm 115 connected with the crank member 105 will contact a tooth 116 of the clutch lever 106 and will force said lever back into latching position, breaking the electric circuit and bringing the end of lever 106 into the path of movement of the rotating clutch member to terminate the cycle.

As set forth in said reference patents, for additive operations, the accumulator shafts 403 are caused to be moved away from the racks of levers 610 before said racks are allowed to move, and will be moved to reengage the accumulator gears 472 (Fig. 1) while the racks lie in the extreme positions permitted by the keys 215 and stop bars 615. As shaft 301 is returned and the racks are raised, the value set in the keyboard will be additively transferred to the register. Suitable well-known control devices also provide for changing the time at which the accumulators are shifted out of and into mesh with the segmental racks 610 so that the accumulators remain in engagement during the first or downward stroke of said racks, and consequently register substractively those amounts set up in the keyboard.

Total taking

A total standing in any one of the registers may be cleared therefrom and printed on the record sheet in well-known manner, by engaging the pinions 472 of the register with the segments 610 and thereafter successively releasing the differential stop bars 615 to allow the segments to rotate the accumulator wheels substractively until suitable zero stops 457 thereon engage cooperating stops 613, which have been brought into their path of movement. The column latches 214 are lifted free of stop bars 615 and the levers 610 thereafter successively released from the restoring frame 616 upon depression of the total key 278 (Fig. 3) in the following manner, and as more fully described in reference Patent 1,994,211.

The rearward end of total key 278, upon depression of said key, will engage a stud 279 to impart clockwise movement to a bail 280. Bail 280 is provided with a cross-over member 281 overlying the forward end of the column latches 214 (Fig. 1) and will therefore, when so moved, rock said latches free of the stop bars 615.

A shaft 282 (Fig. 3) having its right hand end formed as a crank arm projects over the rearward end of the total key and is caused to be rocked counterclockwise upon depression of said key. Secured to shaft 282 is an arm 283 adapted to impart clockwise movement to a latch 620, upon the above-described movement of said shaft, by engagement with a pin 284 secured to control arm 621, pivotally mounted upon said latch.

Figure 1:
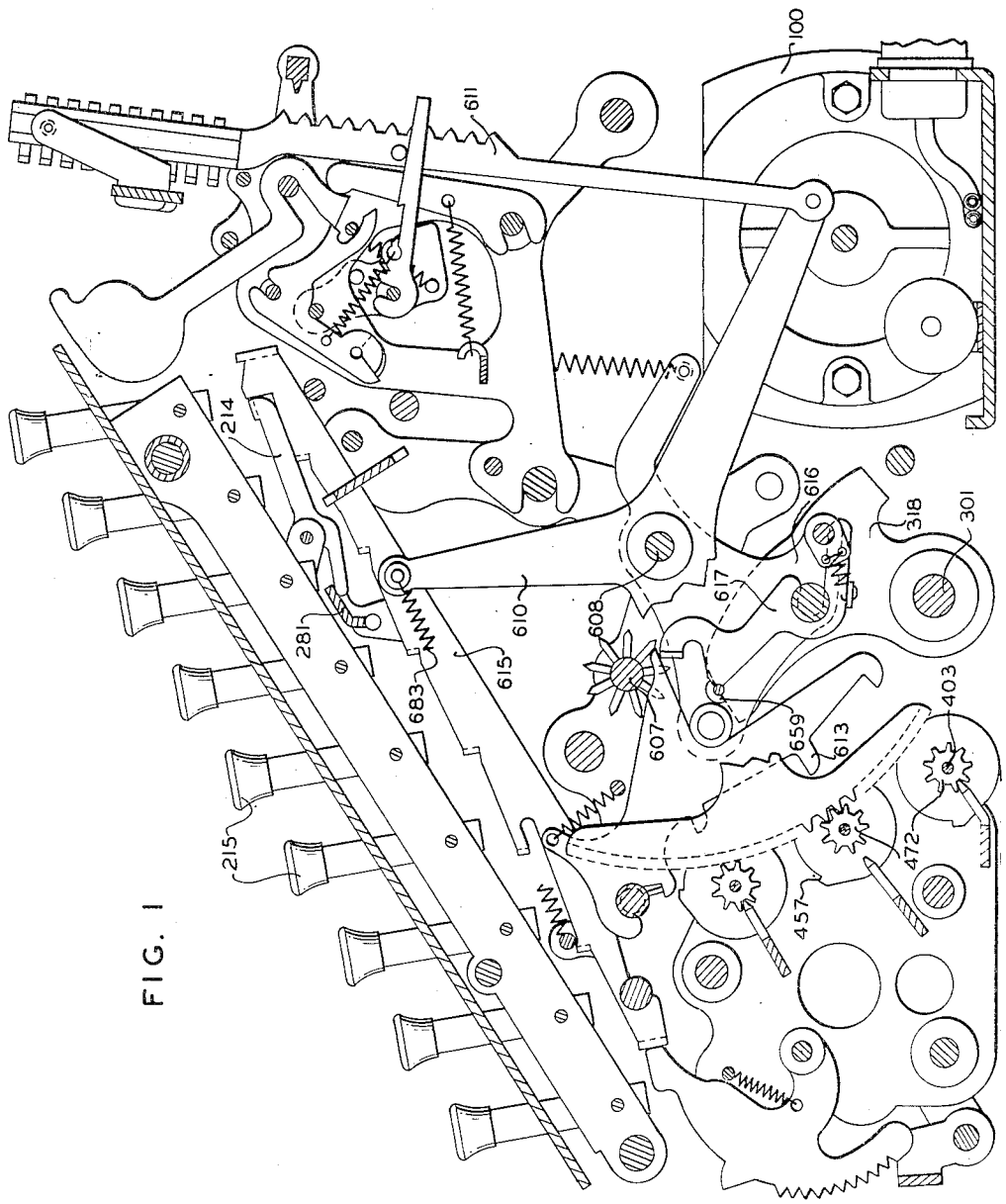
Fig. 1 is a right-hand cross section elevation view taken substantially through the center of the machine showing the keyboard, register actuating, and printing means.

Latch 620 normally engages a lug 627 on total segment 618, preventing movement of said segment under influence of the total spring 681. Upon tripping of the latch, however, segment 618 will be rocked upwardly about its fulcrum point 628 and will impart counterclockwise rotation, through gear 629, to a shaft 607 (Fig. 1). Shaft 607 extends transversely of the machine and is provided with a series of helically arranged pins adapted during rotation of said shaft to trip, successively from right to left, the series of latching dogs 617, mounted upon the frame 616 and engaging studs 659 of the levers 610 as earlier described.

Tripping of dogs 617 will also release spring tensioned stop members 613 permitting said members to move into the path of movement of the zero stops 457 on the accumulator wheels.

As each lever 610 is released its spring 683 will rotate it until the related accumulator wheel has been rotated reversely to zero, when stop 457 will contact with member 613. The value substracted from the wheel is now represented by the type lifted to the printing line.

When this zeroizing operating has progressed to the left-hand side of the machine a stud 630 (Fig. 3) in the total segment 618 will contact with a projection 129 of a rod 130 connected at its other end to the latch member 112. Latch 112 will thus be moved out of engagement from clutch lever 106 (Fig. 2), and effect operation of the cyclic clutch devices, as in the manner earlier described. The machine being put in operation, the printing hammers will be tripped to print the total and the levers and total key 278 returned to normal, in the well-known manner fully set forth in the patents of reference.

Column tabulating

The platen carriage of the machine is tabulated from right to left under the influence of a spring drum 8 (Fig. 4) connected to the carriage by a tape 9, the carriage being held in its various tabulating positions by means of a notched bar 1 fast within the end frames of the carriage and having the walls of suitable notches forming spaced stops 193, engageable successively by the end 6 of the detent 7 (see also Fig. 5) of a cushioned stop locator device, adapted for engagement with the variably spaced stop notches 193 of the notched bar 1 as fully set forth in reference Patent 2,570,931.

Under normal adjacent column tabulation the detent 7 is disengaged from bar 1 near the end of a machine cycle of operation by the downward movement of a member 184, operated in known manner, as set forth in Patent 1,946,572. Upon release of bar 1 by the end 6 of detent 7 the carriage will be pulled toward the left (Fig. 5) by the spring drum 8, and the detent, being immediately released by the member 184, will rise and ride on the under edge of bar 1. The carriage thereafter moves sufficiently to bring an adjacent one of the stop notches 193 of bar 1 into register with the end 6 of the detent 7, and contact the wall 193 of the adjacent notch to arrest the platen carriage.

Control means for skip column tabulating

Skip column tabulations in which the means for releasing detent 7 for reengagement with bar 1 must be delayed until any of the notches 193 of bar 1 that are not to be effective are carried past the end 6 of detent 7 are also provided, as will now be described, and as more fully set forth in said reference Patent 2,570,931.

A three position lever 201 (Fig. 2) pivotally mounted at 202 to the right-hand framing of the machine is normally held in its central position by means of a spring 203 connected at one end to a centralizing lever 204 which engages stud 205 and projection 206 of lever 201. The opposite end of spring 203 is connected to a bell crank lever 207 pivoted to the framing at 208 and serves to bias said lever in a counterclockwise direction.

Pivotally connected at 209 to the lever 207 is an upwardly extending finger 210 provided with a projection 211 normally positioned intermediate of levers 212 and 213 fulcrumed at 216 to the framing of the machine. An arm 217, pivotally connected at 218 to the operating lever 201 extends rearwardly and is provided with a pin 219 projecting into a triangular cam notch 220 of finger 210. A spring 221 connected to finger 210 and arm 217 biases said arm upwardly, forming a yieldable connection between operating lever 201 and finger 210. Lever 207 and finger 210 are held in lower position against tension of spring 203 by engagement of projection 222 of lever 207 with a lower arcuate edge 223 of operating lever 201.

In a rearward movement of operating lever 201, arm 217 will be moved rearwardly and pin 219 engaging the rear cam face of cam notch 220 will cause arm 217 to yield downwardly. Further movement of lever 201 releases arcuate edge 223 from projection 222 whereupon spring 203 will impart counterclockwise movement to lever 207, moving finger 210 upwardly and rearwardly through pin and slot engagement 219, 220, the pin being urged upwardly by spring 221, to position projection 211 of said finger above the lever 212 for the purpose to be described.

A rearward arm 204' of centralizing lever 204 engages a pin 224 of the add key 114 and, during rearward movement of lever 201, pin 205 will rock lever 204 in clockwise direction to depress the add key and start the cycle of operation in the manner previously described, during which cycle the value set up on the digit keys 215 will be stored into the accumulator wheels and printed upon the record tape in well-known manner.

Operating lever 201 is held in operated position by projection 222 of lever 207 until released near the end of a cycle of operation in the following manner:

Mounted upon a cam arm 320 fast to rock shaft 301 is a pin 225, adapted upon return clockwise movement of cam 320 to engage the bottom edge of a one-way pawl 226, pivoted at 227 upon the lever 207, and to rock said lever in a clockwise direction. Clockwise movement of lever 207 will release lever 201 for restoration by centralizer 204, whereupon plus bar 114 is also permitted to return to its normal position and the machine cycle will be terminated, as in the manner heretofore described.

During the above clockwise movement of lever 207, finger 210 is moved downwardly and projection 211, being positioned above lever 212, as previously described, rocks lever 212 counterclockwise which, through a rearward projecting end thereof, imparts a counterclockwise rocking movement to a lever 228 (Fig. 5) fulcrumed at 229 to the machine frame. The left lower edge of said lever slidingly engages the upper edge of detent 7 and, during the above operation, will depress detent 7 and disengage the forward end 6 thereof from the spaced stop surface of a notch 193 of tabulating bar 1 to release the platen carriage for tabulation. The restoration of lever 201 (Fig. 2) also, through pin and slot connection 219, releases the projection 211 from lever 212.

Fulcrumed at 230—231 (Fig. 5) within brackets 232, 233, secured to the stationary framing of the machine, is a square shaft 234 which has a latch arm 235 secured thereto. Arm 235 is held against the forward face of release lever 228 by a spring 236 adapted to impart clockwise rotation (as viewed from the right) to shaft 234. Mounted upon shaft 234 and adapted for rotation therewith is a finger 237 normally held rocked in a forward (counterclockwise) position and out of the path of movement of suitable control pins 240, 240a and 240b fast to the tabulator bar 1 (the control pins 240, 240a and 240b being located upon bar 1 in relation to certain selective columnar positions of the record carriage, as hereinafter to be described) by the above engagement of latch arm 235 with lever 228, which holds shaft 234 in counterclockwise direction against the action of spring 236.

Upon rocking of lever 228 to release detent 7 from bar 1, however, said lever is moved beneath arm 235, permitting said arm to rock rearwardly or clockwise with shaft 234. In this position, arm 235 will engage the upper left top surface of release lever 228 and hold it in operated position. At the same time, finger 237 is moved into the path of movement of the control pin 240 positioned upon the tabulator bar 1, corresponding to a spaced stop 193 of the columnar position to which the platen carriage is to be brought to rest.

Upon release of detent 7 from a spaced stop 193 in a machine cycle of operation performed under control of a rearward movement of lever 201 therefore, the platen carriage is shifted toward the left (toward the right in Fig. 4) under influence of spring drum 8 and will now continue its movement until brought to rest by engagement of a pin 240 with the cam edge 241 of finger 237, said engagement serving to rock shaft 234 to disengage latch arm 235 from release lever 228 in time to permit reengagement of the end 6 of detent 7 with a stop edge 193 to bring the carriage to rest.

A forward movement of operating lever 201 (Fig. 2) will act to not only render ineffective the previously described stop devices for bringing the carriage to rest in successive columnar positions but will also render ineffective the above-described skip tabulating stop means controlled by the pin 240 so that the carriage will then continue in a tabulating movement until stopped in a later columnar position by means of a second control pin 240a as follows:

Forward movement of operating lever 201 through pin and slot connection 219—220 will raise and position the projection 211 of finger 210 above the lever 213 so that as finger 210 is subsequently restored at the end of the cycle of operation, as earlier described, projection 211 will rock the lever 213 counterclockwise. A projection 212' of the lever 212 underlies the lever 213 and during said operation of lever 213 lever 212 will also be rocked to release the carriage locator detent 7 from bar 1 as earlier described.

A downwardly extending arm of lever 213 is provided with a pin 357 engaging the lower edge of a latch member 358 pivotally mounted at 359 to the stationary frame of the machine. During the above operation of lever 213, pin 357 is carried rearwardly and latch 358, under influence of spring 356, is moved into position for holding the lever 213 and through levers 212 and 228 also the detent 7 (Fig. 5) in their operated positions, until released in the manner to be described.

The earlier described engagement, therefore, of a control pin 240 with the finger 237 will at this time be ineffective of releasing detent 7 and the carriage will continue further in a tabulating movement until stopped by a subsequent engagement of the finger 237 with a suitably placed secondary control pin 240a, the stopping devices being rendered effective as hereinafter to be described.

Carriage control of registers

Well-known register control means for effecting a register selection and the character of operations to be performed thereon in accordance with the tabulated position of the record carriage are provided, said control means being operated automatically upon release of a spring charged clutch operating lever 33 (Fig. 4) by the earlier described movement of the carriage tabulating detent 7, as in the manner fully disclosed in U. S. Patent 2,209,512, issued July 30, 1940, to Loring P. Crosman.

Upon operation lever 33 will engage a pin 37 fixed to a clutch control lever 38, moving the latter about fulcrum 40 out of engagement with the usual pawl of the spring engaged one-cycle clutch means 24, of well-known design.

Clutch 24 is adapted to connect the motor 100 with a shaft 56, having fast thereon a crank arm 58 connected by link 67 (Fig. 8) with a rocker 69, loosely mounted on the shaft 301, to thereby impart a reciprocatory movement to said rocker. Rocker 69 has suitable spring connections 94 with a series of levers 93, connected each by a link 96 with one end of whiffletrees 86, the other ends of the whiffletrees being connected with suitable feelers 83 adapted for sensing an index tube 82 of the carriage to thereby control register selection and operation in the well-known manner set forth in U. S. Patent 1,946,572.

Power carriage return means

Power means for returning the record carriage is provided, as also fully described in said reference Patent 1,946,572, wherein an arm 315 (Fig. 3) secured to one end of a transverse square-shaped shaft 199 is adapted, in a clockwise movement of said shaft, to tension a spring 317 secured to one end of a link 319. The opposite end of link 319 being pivotally connected at 327 to a latch 328, pivotally mounted upon a plate 329, fulcrumed at 330 to a suitable bracket fast to the machine framing.

Latch 328 is held by the tension of spring 317 against a stud 331 fast to the lever 163 mounted upon the transverse shaft 164. The lower end of lever 163 has link connection 162 with the arm 316 (Fig. 2), oscillated through link connection 108 by the motor driven crank arm 105, as earlier described. As lever 163 is rocked during the forward movement of cam 316, latch 328 is permitted, under influence of spring 317 to move into the path of a return movement of the stud 331.

Near the completion of the operating cycle of the machine, stud 331 will act to engage the hook end of latch 328 and rock plate 329 upwardly about its fulcrum 330.

Plate 329 has flexible link connection 332 with a clutch operating member 333 and, as plate 329 is rocked upwardly, link 332 will exert a twisting action to the clutch lever 333 whereby suitable projections 334 will tend to impart a lateral movement to suitable friction discs 335 to cause operation of the well-known carriage return clutch means. Operation of the carriage return clutch effects return movement of the platen carriage through means of a ribbon tape 336 one end of which is wound upon a drum 337 of said clutch while the other end is secured to an arm 338 (Fig. 7) fulcrumed upon the left end of the platen support shaft 339. The arm 338 is also adapted in an operation of the carriage return means to effect the throat opening of well-known front feed devices, as hereinafter to be described. Having in mind the foregoing general description of certain portions of the machine to which the present invention is to be applied, a preferred means embodying the invention together with the mode of operation thereof is believed best set forth in connection with a particular posting routine application. It is understood, however, that the invention is not limited to the precise form to be described herein but is as equally well suited to various other applications and modifications as fall within the scope of the appended claims.

Control devices for posting routine

As earlier set forth, the present invention includes the provision of means adapted not only to automatically return the record carriage to an initial or "Old Balance" columnar position following an operation in a terminal entry or "New Balance" columnar position incident to a normal posting routine operation, which operation relates only to entries made in tabulated positions of the carriage preceding said "New Balance" columnar position, but is also adapted to effect multiple entries in the columnar position (Deposit) preceding said terminal entry (New Balance) column in alternate manner with multiple entries that are to be made in a column (Delay Credit) which is a tabulated position of the carriage past said terminal entry columnar position.

Means are also provided to selectively control the return movement of the carriage following a final entry in said "Delay Credit" column, whereby the carriage is caused to return automatically to the "New Balance" position (in lieu of the Deposit Column), automatically print the new balance and thereafter return automatically past the "Deposit" column to its initial starting "Old Balance" position.

Figure 11:
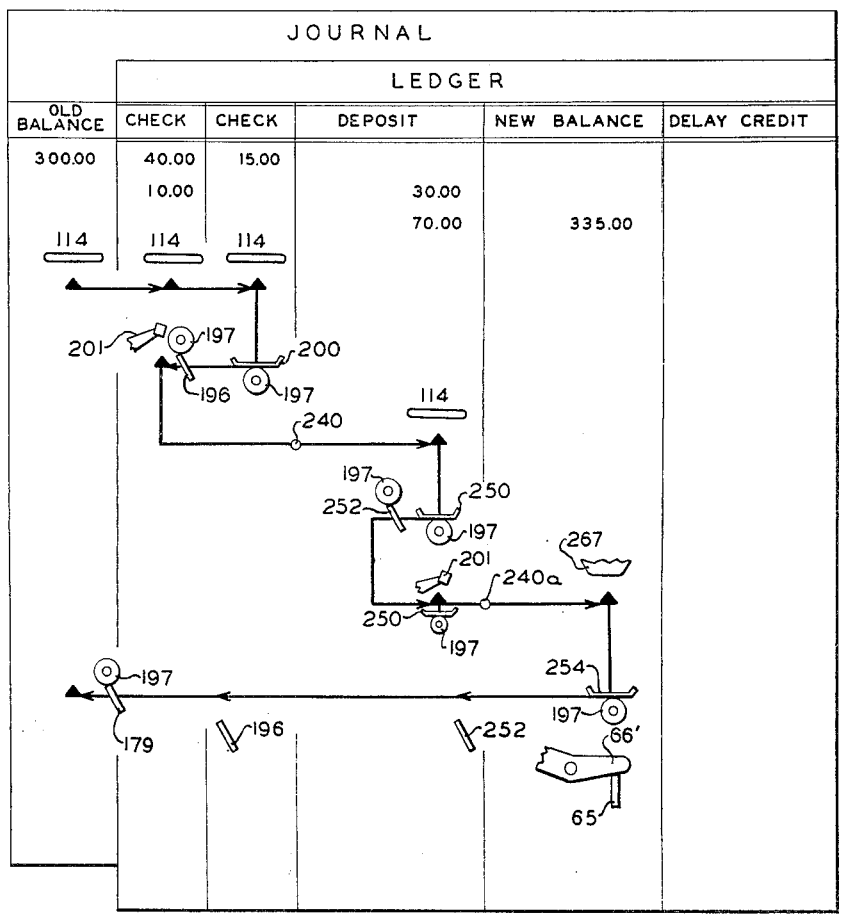
Fig. 11 is an illustration of one example of work performed by the machine, including a schematic illustrating the sequence of operations of the platen carriage in performing the work.

The example illustrated in Figure 11 represents a normal posting routine, i. e., one not involving a delayed credit item, while that of Figure 12 represents a posting routine in which the deposit entries include both normal and special item deposits, the latter requiring related entries to be made in the "Delayed Credit" column. Figures 11 and 12 also diagrammatically illustrate tabulating and return movements of the record carriage, as controlled by various operating keys and cam members during said posting routine operations.

The first routine run, involving three check entries of $40.00, $15.00 and $10.00 respectively, and two normal deposit entries of $30.00 and $70.00 (Fig. 11) is effected as follows.

The platen carriage is placed toward the right, as viewed by the operator, and with the journal and ledger sheets having been inserted upon the platen, through well-known open throat front feed devices, similar to that disclosed in U. S. Patent #2,118,700, issued May 24, 1938, to Loring P. Crosman, the carriage is then closed to the position illustrated by broken lines in Figure 7.

Figure 2:
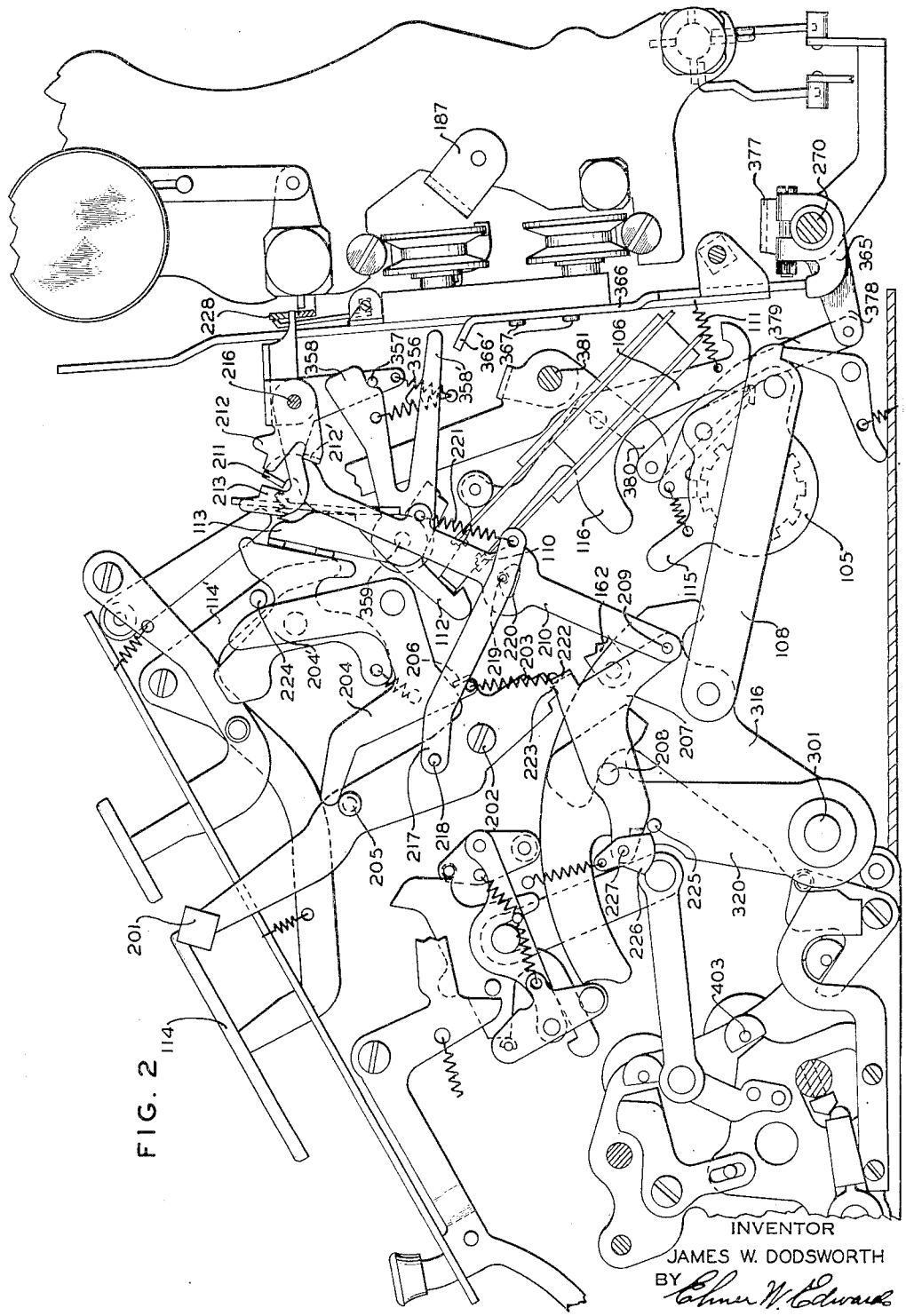
Fig. 2 is a right side elevation view of the cyclic operating devices and the control means therefor, the parts being shown in their normal position of rest.

An old balance amount ($300.00), carried forward from a previous operation, is set up on the keys 215 (Fig. 1) and caused to be entered additively into the register devices while printed upon the left-hand or "Old Balance" column of the journal sheet, in an operation of motor key 114 (Fig. 2). For the above operation, and in subsequent operations to be described, the selection and character of operations to be performed upon the registers are effected automatically, in accordance with the columnar position of the record carriage, through the well-known program devices earlier set forth, and described more fully in U. S. Patent #1,946,572. Following the printing of an old balance entry upon the journal sheet in the above operation, the tabulating release member 184 (Fig. 5) trips detent 7 from bar 1 and the record carriage thereupon will tabulate to the adjacent "Check" column of the ledger sheet, as in the known manner earlier described.

A withdrawal check in the amount of $40.00 set up on keys 215 (Fig. 1) is now subtracted from the register and caused to be printed in the first "Check" column of the ledger sheet by again initiating a motor operation through operating key 114 (Fig. 2), in the usual manner, and the carriage thereafter tabulates to a second "Check" printing column position.

A second check entry $15.00 is also entered in the register and printed upon the second "Check" column of the ledger sheet through operating key 114 in regular manner. However, the record carriage in lieu of tabulating at this time is now caused to be automatically returned to the first "Check" columnar position for a third check entry. For this purpose suitable cam shoes 196 and 200 (Figs. 6 and 11) supported upon a transverse control bar 195 mounted within the left and right end framing of the carriage, are positioned respectively relative to the first and second check columns.

Figure 3:
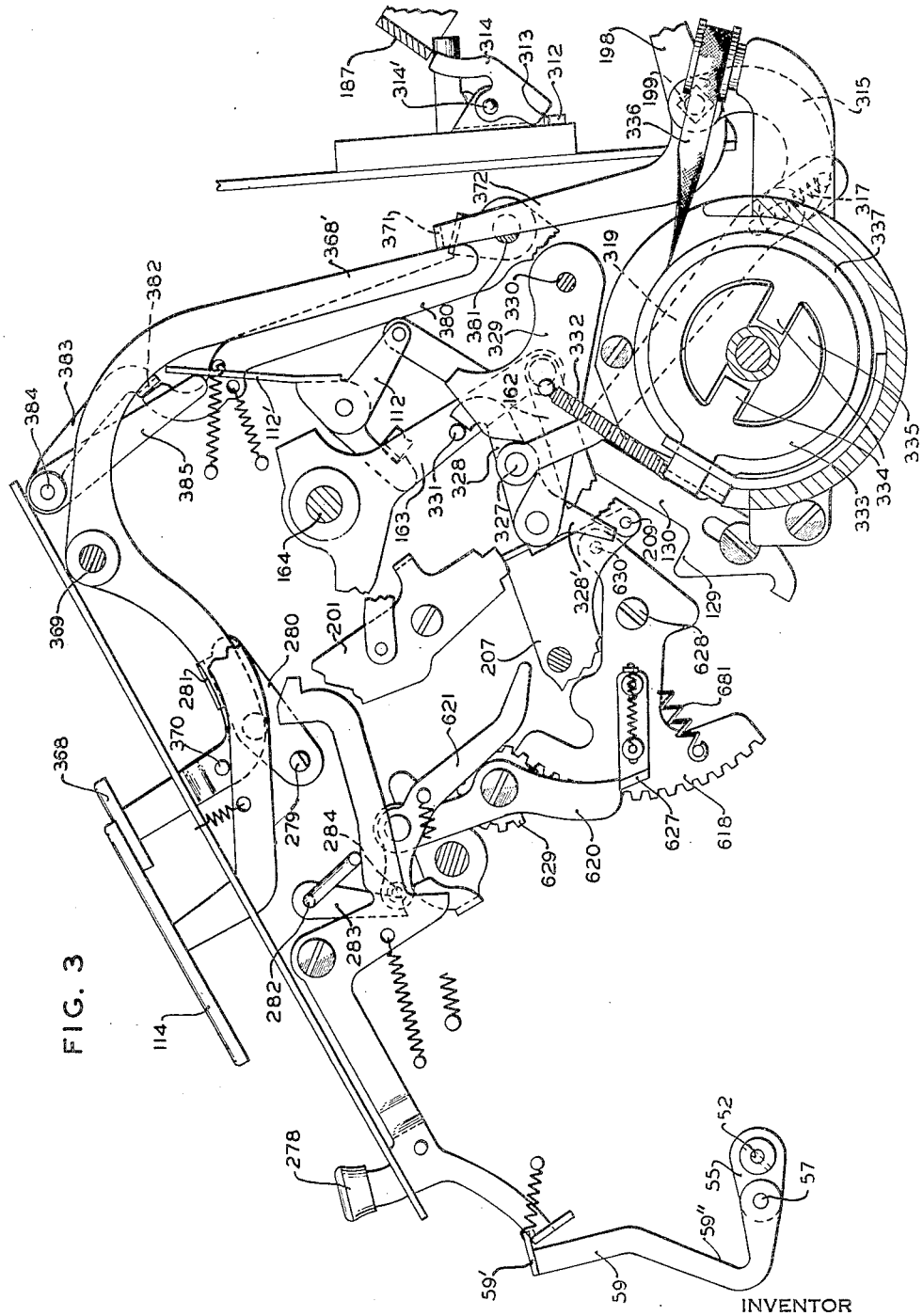
Fig. 3 is a right side elevation of the total taking devices and portions of the automatic carriage return means.

In the above-described tabulating movement of the record carriage into the second check columnar position cam shoe 200 will be brought to rest upon the roller 197 of arm 198 (Figs. 3, 4 and 8), fast to the square shaft 199 and thus depress said roller to rock and hold shaft 199 in a clockwise position (Fig. 3). When held in clockwise position shaft 199, as earlier described, acts to effect operation of the carriage return clutch means 334, so that following the machine cycle of operation related to the second check entry the carriage will start in a return movement. Cam member 196 (Fig. 6) is mounted pivotally, for the purpose to be later described, upon bar 195 at 196' relative to the first check position and during the above return movement of the carriage said cam will act to restore the depressed roller 197 upwardly thereby disengaging latch 328 (Fig. 3) from stud 331 and terminating the return movement of the carriage opposite the first "Check" columnar position. During the described restoration of roller 197 cam shoe 196 (Fig. 6) is prevented from rotating about fulcrum 196' through the locking effect of an L-shaped slot therein engaging with screw stud 175 fast upon a tie rod 177, said rod being supported for transverse movement, upon bar 195 of the carriage, as will hereinafter be described.

Figure 8:
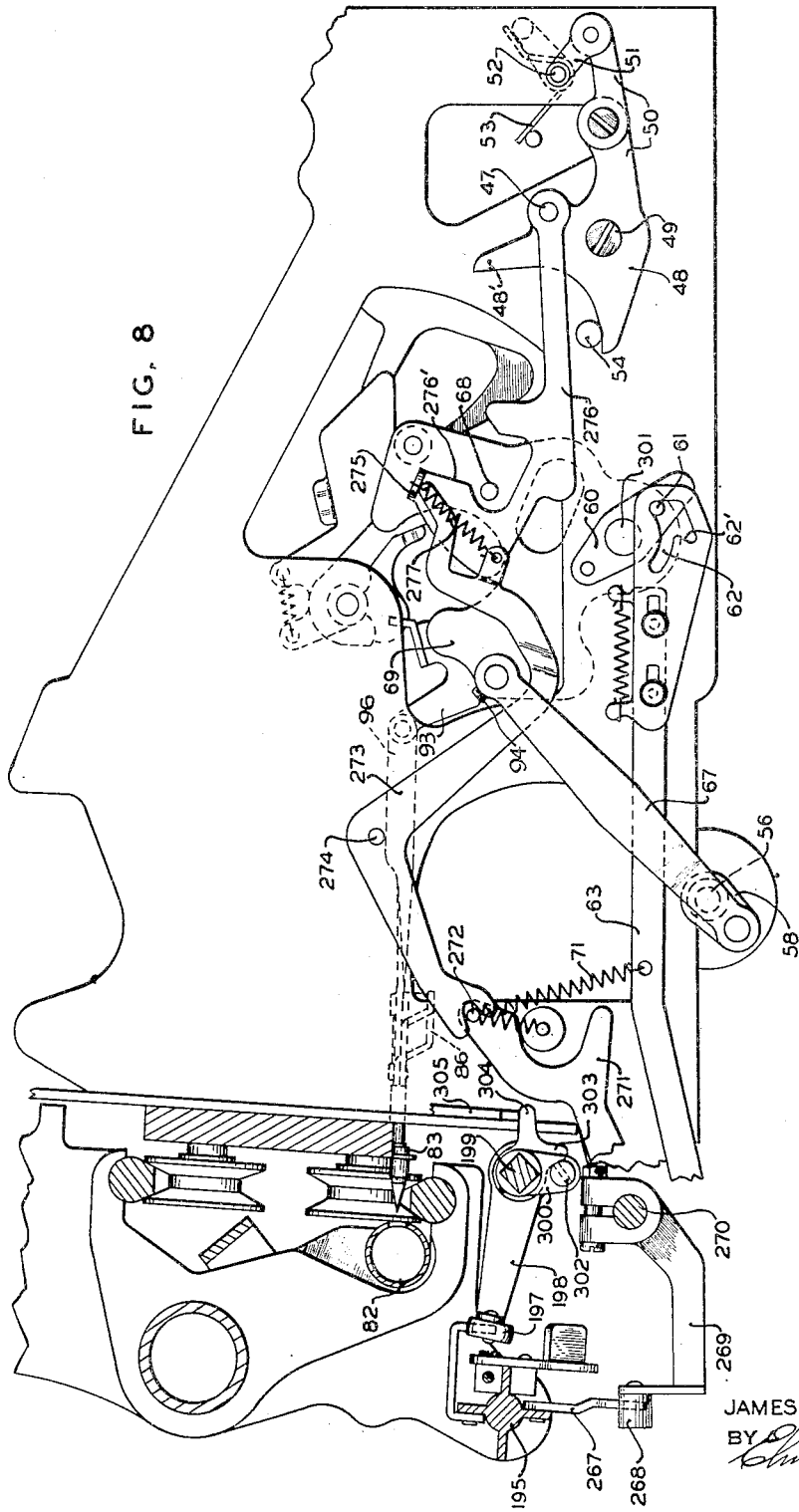
Fig. 8 is a left side elevation of a portion of the automatic register control devices and means operable therewith for adjusting certain of the carriage supported cam means to modify a control of the carriage.

To effect a line space operation of the paper feed devices during the above return movement of the carriage an arm 300 (Figs. 4 and 8) secured to shaft 199 is provided with a stud 302 having engagement with a bell crank lever 303 and adapted in the above movement of shaft 199 to rock said bell crank in a counterclockwise direction, as viewed in Figure 8. Counterclockwise movement of bell crank lever 303 will impart through an arm 304 thereof, a counterclockwise movement (Fig. 4) to a bell crank lever 305, pivotally secured at 306 to the rear frame of the machine. An arm 307 of the bell crank lever 305 has engagement with a downwardly extending lever 308 pivotally mounted to the inside of the rear framing upon a stud 309, which stud extends through the frame and has secured to the opposite end thereof a laterally extending arm 310. A suitable tension spring 311 serves to hold the arm 310 in the counterclockwise position shown in Figure 4. In the above counterclockwise movement of bell crank lever 305 arm 307 rocks lever 308 together with arm 310 clockwise about fulcrum 309 and thereby carries a projection 312 of arm 310 into engagement with the cam surface 313 (Fig. 3) of a latch member 314, pivotally mounted at 314' upon a suitable bracket fast to the machine frame. Engagement of projection 312 with cam surface 313 moves latch 314 counterclockwise out of the path of downward movement of a transverse bar 187, pivotally mounted to the left- and right-hand framing of the shiftable record carriage. As shown in Figure 7, bar 187 is normally held in raised position by means of a roller 188 secured to an arm 189, the said arm being adapted for reciprocatory movement during an operation of shaft 164 by cam arm 316, previously described.

In the forward excursion of cam arm 316 a consequent counterclockwise movement (Fig. 7) of shaft 164 permits downward movement of arm 189, and latch 314 being positioned out of the path of movement of bar 187 said bar is free to move downwardly and allow pawl 814, through action of spring 880 to raise and engage with the platen ratchet 820. The return movement of the parts will act to restore pawl 814 to normal position, advancing the platen and disengaging the pawl from ratchet 820 in known manner.

In the above described movement of arm 310 a projection 310' (Fig. 4) of said arm engages the surface 191 of a latch member 192, pivoted on arm 184, and moves the surface 194 of said latch out of cooperation with projection 189' of arm 189 and thereby renders inoperative the arm 184 of the carriage escapement return means previously described.

So that the carriage may tabulate past the second "Check" columnar position, the final check entry ($10.00) will be made at this time by initiating a cycle of operation through means of a rearward movement of the Skip/Balance lever 261 (Fig. 2), whereupon, following said entry the carriage, as in the manner earlier described, will now tabulate until brought to rest in the "Deposit" columnar position by means of a suitably placed pin 240 (Fig. 5) of bar 1 engaging the projection 241 of the skip-tabulating control means adapted for releasing carriage detent 7 for reengagement with tabulating bar 1.

The first entry ($30.00) (Fig. 11) to be made in the "Deposit" column comprises a normal deposit entry (not involving a delay credit) and since, in the present example, the first deposit entry is to be followed by a second deposit entry ($70.00) to be made in the same columnar position of the carriage the first deposit entry will be made through means of operating key 114 (Fig. 2) in the usual manner. However, to disable the carriage tabulating devices and to enable an operation of the line space devices during the first deposit entry a suitable cam shoe 250 (Fig. 6) is placed upon bar 195 in position to engage and hold roller 197 in a depressed position while the carriage is in the "Deposit" columnar position, as in the manner described for cam shoe 200.

It will be recalled that roller 197 in depressed position effects operation of the carriage return clutch devices 334 (Fig. 3). Therefore, the following means are provided for interrupting such return movement of the carriage at this time before the carriage is moved out of the "Deposit" columnar position.

Supported pivotally at 251 (Fig. 6) upon bar 195 in relation to the "Deposit" columnar position of the carriage is a cam shoe 252 held normally in clockwise raised position, about point 251, for cooperation with roller 197 when said roller is in the depressed position. Cam shoe 252 is normally locked in its raised position by engagement of the screw stud 253 fast to the rod 177 and having engagement with a suitable L-shaped slot 252 of said cam shoe.

As the carriage starts in the return movement following such deposit entry therefore, cam 252 acts to immediately restore roller 197 together with shaft 199 (Fig. 3) and thereby disengages latch 328 from the operating pin 331 in time to interrupt operation of the return clutch 334 before the record carriage has moved out of the "Deposit" columnar position, and the carriage thereupon tabulates a partial step of movement and comes to rest again in the Deposit position.

The second deposit entry ($70.00) is a final normal deposit entry and will be made by means of a rearward movement of "Balance" operating lever 201 (Fig. 2), whereby the described line spacing and carriage return means controlled by the cam 250 (Fig. 6) are now caused to be disabled by special means so that the carriage is thus permited to tabulate to the "New Balance" columnar position following such operation, as will now be described.

It is recalled that a rearward movement of lever 201 releases the bell crank lever 207 for counterclockwise movement, under influence of spring 208, and that said movement acts to adjust the projection 211 of finger 210 above lever 212 for the purpose of effecting a subsequent release of detent 7 (Fig. 5) from the tabulating bar 1. Also that in such an operation the latch 235 engages with lever 228 and holds detent 7 in depressed position, so that the carriage may then continue in a tabulating operation until latch 235 is subsequently released from the lever 228. To release latch 235 from lever 228 therefore in time for detent 7 to reengage with tabulating bar 1 and thus stop the carriage in the "New Balance" columnar position a control pin 240a, similar to the control pin 240 earlier described, is positioned upon bar 1 between the "Deposit" and the "New Balance" columnar positions.

To permit the tabulating operation described above an operation of the carriage return devices as controlled by the cam 250 is rendered ineffective by special means as follows.

Bell crank lever 207 (Figs. 2 and 3) is provided with a pin 209, being also the pivot point of finger 210 upon lever 207, and as lever 207 carries finger 210 upwardly, following operation of lever 201, pin 209 will be carried upwardly therewith to a position rearward of a downwardly extending arm 328' of the latch member 328, earlier described. Thus, as stud 331 of lever 163 moves forwardly during a cycle of operation initiated by key 201, arm 328' will engage with pin 209 of lever 207 so that latch member 328 at this time will be held free of the return movement of stud 331, whereby operation of the carriage return clutch means 334 will be prevented. A subsequent restoral of bell crank lever 207 near the extreme end of the machine cycle, by the pin 225 of arm 320, thereafter releases latch 328 for reengagement with the underside of stud 331, as shown in Figure 3.

It is desirable that the new balance be printed along the same line as the final deposit entry and the following means therefor are provided whereby at this time an operation of the line space devices, as controlled through depression of roller 197 (Figs. 4 and 6) by the cam member 250, will be disabled.

Figure 9:
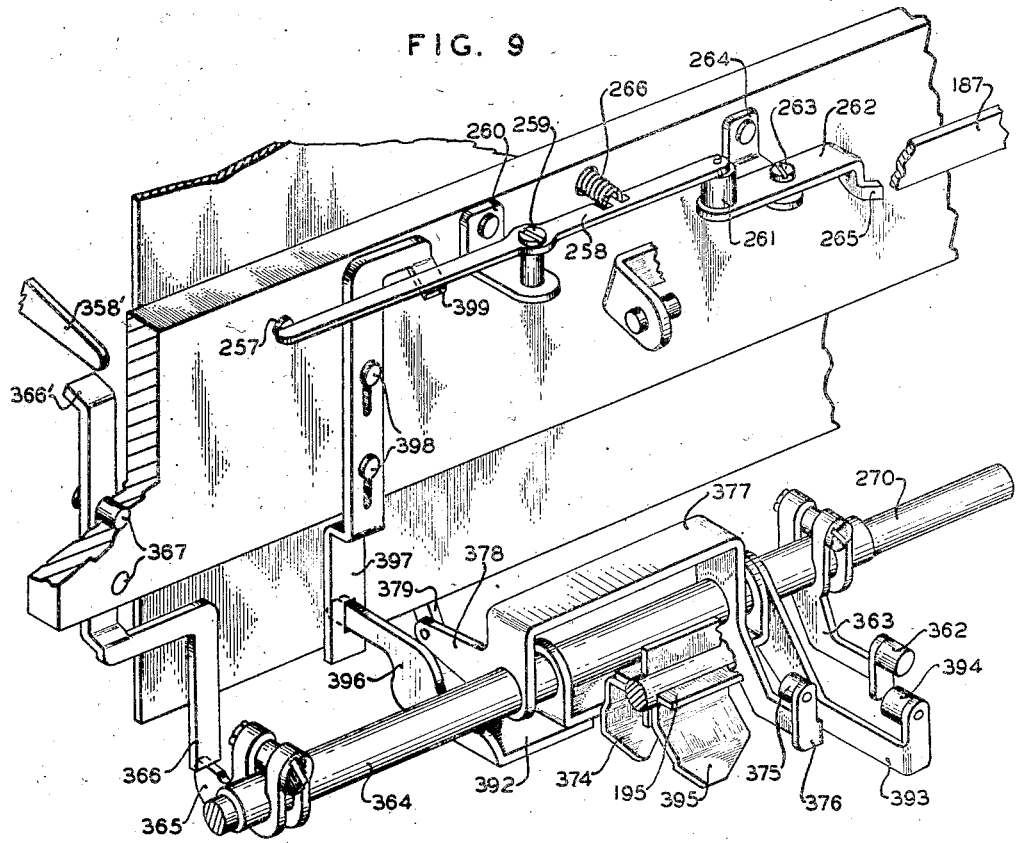
Fig. 9 is a rear perspective view of devices operable by the carriage to control line space means and to render certain tabulating stop means effective.
Figure 10:
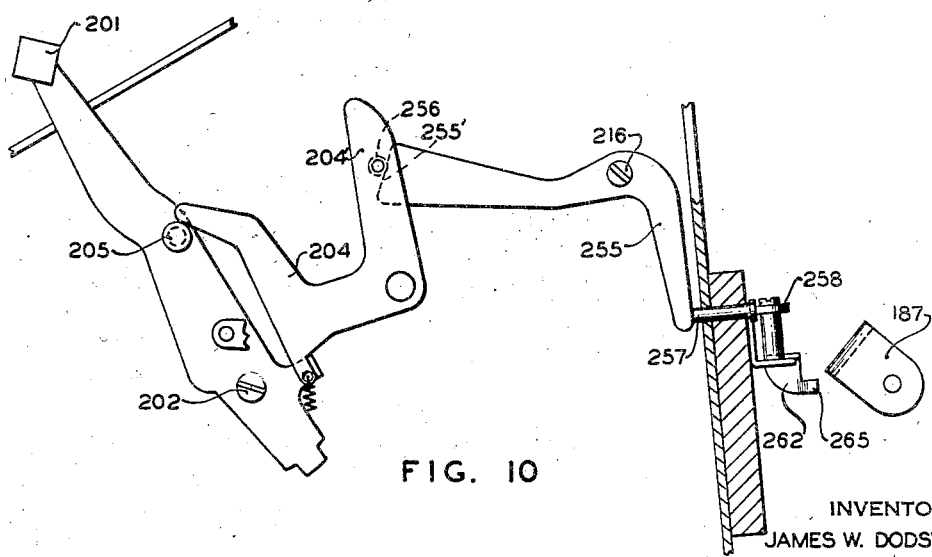
Fig. 10 is a detail view of certain devices for disabling a line space operation.

With reference to Figures 9 and 10, there is pivotally mounted at 216 to the right-hand frame of the machine a bell crank member 255 the forward arm of which terminates in a cam surface 255' having engagement with a pin 256 in the arm 204' of bell crank lever 204. The lower arm of bell crank 255 engages the forward surface of a plunger 257 extending through the rear framing of the machine and having engagement with one end of a lever 258 fulcrumed at 259 upon bracket 260 of the rear framing. The opposite end of lever 258 has pivoted connection 261 with a lever 262 fulcrumed at 263 to bracket 264 secured to the rear frame. The left end (right end in Fig. 9) of lever 262 is provided with a projection 265 normally held retracted, out of the path of movement of transverse bail 187 for operating the line space devices earlier described, through means of suitable compression spring 266.

Upon initiation of a final deposit operation by means of Skip/Balance lever 201 therefore lever 204 being rocked clockwise will impart counterclockwise movement to bell crank 255, through engagement of pin 256, and the lower arm of bell crank 255 imparts a rearward movement to the plunger 257. Rearward movement of plunger 257 rocks the lever 258 counterclockwise and the lever 262 in a clockwise direction to thereby position projection 265 beneath transverse bail 187. As roller 188 (Fig. 7) moves downward in the instant cycle of operation bail 187 will now be held from following said roller and no line space operation is effected at this time.

Following a final deposit entry, with the carriage now having been tabulated to the "New Balance" position, an automatic totalizing operation is effected for a printing of the "New Balance" total, following which the record carriage thereafter returns automatically to the intial or "Old Balance" columnar position, as in the manner now to be described.

*Automatic total means*

As the record carriage tabulates into the "New Balance" columnar position a cam plate 267 (Figs. 6 and 8) secured to transverse bar 195 of the carriage is brought to rest upon a roller 268 of a lever 269 fast to a transverse shaft 270. Shaft 270 is pivotally supported within the base structure of the machine and in the above engagement of cam plate 267 with roller 268 will be rocked in a counterclockwise direction, as viewed in Figure 8.

Secured to the left end of shaft 270 is an arm 271 having pin and slot connection 272 with a lever 273 fulcrumed at 274 to the left-hand framing of the machine. The forward end of lever 273 has engagement with a projection 275 of a pawl 276, pivotally mounted at 47 upon a bell crank lever 48. Projection 275 serves to normally hold pawl 276 out of the path of movement of a pin 68 secured in the rock arm 69 of the power operated register program controll means earlier described. Upon counterclockwise movement of shaft 270, however, arm 271 imparts clockwise movement to lever 273 and the forward end of said lever moving downwardly will permit pawl 276, under influence of spring 277, to fall and rest upon pin 68.

Bell crank 48 is pivotally mounted to the framing at 49 and the forward end of said bell crank forms a toggle link connection 50 with an arm 51 fast to a shaft 52, normally tensioned under influence of a suitable spring 53 for clockwise rotation, as viewed in Figure 8. Spring 53 through toggle action of link 50 serves to hold lever 48 normally against the stud 54 fast in the machine framing.

During a reciprocatory movement of rock arm 69, upon operation of the register program devices previously described, the surface 276' of pawl 276 will now fall into the path of return movement of the pin 68. Lever 48 therefore during the last portion of the return movement of said pin will now be rocked counterclockwise beyond toggle center position, whereupon spring 53 will act to complete the movement and impart a clockwise rotation to the shaft 52, until stopped by contact of an arm 48' of lever 48 with stud 54.

Pivotally mounted at 57 (Fig. 3) upon a crank arm 55, secured to the right-hand end of shaft 52, is a finger 59, provided with a projection 59' normally overlying the forward end of the total key 278. In the above-described operation of shaft 52 finger 59 is carried downwardly to depress the total key 278, and thereby effect an automatic operation of the totalizing devices for a printing of the "New Balance" total $335.00, as in the manner earlier set forth.

Near the end of the rotation of shaft 52 (counterclockwise as viewed in Fig. 3) the surface 59" of finger 59 will contact the hub of crank arm 55 and cause said finger to be rocked free of the total key 278.

*Means automatically returning platen carriage from terminal to starting columnar position*

Following the above-described automatic total printing operation the platen carriage is returned to its extreme right-hand position automatically in the following manner.

Secured to the transverse bar 195 of the platen carriage is a cam member 254 (Fig. 6) adapted as the carriage tabulates to the "New Balance" columnar position to engage and depress roller 198, for effecting an operation of the carriage return clutch following the cycle of operation for the new balance entry, as in the manner previously described in connection with the cams 200 and 250.

It will be recalled, however, that roller 198 in a depressed position is adapted for cooperation with the cam member 196 and 252 for the purpose of restoring shaft 199 to disengage latch 328 (Fig. 3) from stud 331 and thereby interrupt a return movement of the carriage relative to the first "Check" and the "Deposit" column respectively. Special means therefore are now provided to disable said cam members at this time so that the carriage will be free to continue without interruption to the initial or "Old Balance" columnar position.

With reference to Figure 2, it is recalled that rock shaft 301 is caused to be reciprocated through link 108 upon a release of the cyclic clutch 105. Secured to the left end of shaft 301 is an arm 60 (Fig. 8) provided with a pin 61 extending through bayonet slot 62 formed in the forward end of a link 63. The rearward end of link 63 has pivotal connection at 64 (Fig. 7) with a downwardly extending portion of a bell crank member 65, loosely supported upon the shaft 270. One end 65' of bell crank 65 extends rearwardly beneath the path of movement traversed by a bell lever 66 pivoted at 70 (Fig. 6) upon transverse bar 195 of the carriage. As the record carriage is moved into the "New Balance" colunar position the end 66' of lever 66 is brought to rest directly above the end 65' of bell crank 65.

Link 63 Fig. 8 is weighted to remain normally in a downward position, against the tension of a spring 71 which yieldably connects said link with the arm 271 operated through shaft 270 by the automatic total cam 267 above-described. Thus pin 61 of arm 60 normally during each operation of rock shaft 301 will move idly in the slot 62 of link 63. In an operation of shaft 270 by cam 267 for effecting an automatic total operation, however, a consequent counterclockwise movement of lever 271 increases the tension exerted by spring 71 upon link 63 and thereby lifts the forward end of said link to bring a shoulder 62' thereof, formed by slot 62, into cooperation with pin 61. During a new balance total operation therefore pin 61, in an operation of shaft 301, now engages shoulder 62' and imparts a rearward movement to the link 63. Rearward movement of link 63 rocks lever 65 (Fig. 6) in a clockwise direction and the end 65' of said lever engaging arm 66' imparts a counterclockwise movement (Fig. 6) to the bell crank lever 66. An upwardly extending arm of bell crank 66 is provided with a suitable slot 72 embracing a screw stud 73 secured to the transverse tie rod 177 mounted for slidable movement on bar 195, as earlier described.

In the above-described counterclockwise movement of bell crank 66 tie rod 177 will be moved toward the left along bar 195 and the studs 175, 253 are carried thereby along the L-shaped slots of their respective cam shoes 196, 252 to release and rock said cams downwardly out of cooperating position relative to the depressed roller 197. Thus a return movement of the record carriage, as initiated upon depression of roller 197 by the cam member 254, will continue at this time uninterrupted until brought to rest at the initial or "Old Balance" columnar position, through the following means.

Pivotally supported at 178 upon the left end of bar 195 is a cam shoe 179 having pivotal connection at 180 with the tie rod 177 connected to bell crank lever 66. In placing the record carriage to the right for bringing the "Old Balance" column to printing position for starting the described series of posting operations the roller 197 being in normal raised position is placed over cam shoe 179, which shoe at such time will be in the normal clockwise lowered position as shown in Figure 6. The cam shoes 196 and 252 at this time are also held by tie rod 177 in their clockwise setting ready for cooperation with roller 197, at such times as said roller may be in depressed position.

Upon counterclockwise operation of lever 66 above-described a consequent leftward movement of tie rod 177 acts to impart a counterclockwise movement to the cam shoe 179 and thereby raise the cam surface 179' of said shoe to position for subsequent engagement thereof with the roller 197 during a return movement of the carriage. Engagement of cam shoe 179 with roller 197 as the carriage completes its return movement to the "Old Balance" columnar position imparts clockwise movement to the cam shoe 179 and through tie rod 177 restores cam shoes 196, 252 to their normal raised positions. A continued rightward movement of the rod 177 thereafter moves studs 175 and 253 into the L-shaped slots of cam shoes 196, 252, thus locking said shoes in raised position, whereby the record carriage in subsequent operations is again caused to be normally interrupted relative to the "Checks" and "Deposit" columnar positions as in the manner and purpose described.

In the above-described operation the movement of cam shoe 179 will be limited by engagement of the pivot stud 180 with flanged bar 195 so that as the record carriage moves into final position of rest, cam shoe 179 acts to lift roller 197 to normal raised position and thereby pull the latch 328 (Fig. 3) free of pin 331 to terminate operation of the return clutch and thus conclude the posting sequence of operations.

*Automatic carriage opening*

As previously described, the carriage return tape 336 at one end is secured to the rearwardly extending arm of a bell crank member 338 Fig. 7, loosely supported upon the left end of the platen support shaft 339. Upon operation of the carriage return clutch 334 therefore tape 336 will act to exert a counterclockwise torque to bell crank member 338.

Pivotally mounted upon the left-hand end frame of the platen carriage at 340 is a latch member 341, provided with a lug 342 normally underlying a shoulder 343 formed in the lower end of a downwardly extending finger 344. Finger 344 has pivotal connection 346 with lever 338 and is guided at the lower end thereof through pin and slot connection 345 with the carriage end plate. As tape 336 effects a return movement of the carriage from either the "Check" or the "Deposit" columns, in the manner described above the lug 342 of latch 341 cooperates with shoulder 343 of finger 344 and will act to prevent a counterclockwise movement of lever 338 and so disable an opening of the carriage front feed devices at such times.

Operation of lever 66 Figs. 6 and 7 and consequent leftward movement of tie rod 177 during the terminal "New Balance" operation above-described, however, is utilized to disable said preventing means, so that the front feed devices following such operation is automatically moved to its open throat position as follows.

The left end of tie rod 177 is formed in an upwardly extending crescent 177', which underlies the cam surface 347 of a projection 348 on a bell crank lever 349, also pivoted to the left-hand carriage frame at 340. Lever 349 through suitable spring 350 is biased in a clockwise direction and a pin 351 thereon engaging the rearward edge of latch 341 serves to hold said latch normally in effective position for the engagement of shoulder 343 with lug 342 described above.

It is recalled that leftward movement of tie rod 177 is effected by lever 66 in a rearward movement of link 63 (Fig. 8) by pin 61 of arm 60 and that said movement occurs during forward reciprocatory movement of the cyclic operating shaft 301. It is to be noted therefore that such operation is timed to occur prior to an operation of the carriage return clutch devices 334 (Fig. 3), through engagement of pin 331 with latch member 328 in a return movement of shaft 301, as earlier described. Upon leftward movement therefore of rod 177 the crescent shaped end 177' thereof engages cam surface 347 and rocks bell crank 349 in a counterclockwise direction. Bell crank 349 has yieldable spring connection 352, for the purpose hereinafter to be described, with latch member 341 and during said operation of bell crank 349 latch 341 is also rocked counterclockwise, to thus move lug 342 free of shoulder 343 prior to initiation of the above-described return movement of the carriage from the "New Balance" columnar position.

Upon subsequent operation of tape 336 in returning the record carriage following a terminal (New Balance) operation therefore lever 338 is now caused to be rocked in a counterclockwise direction by said tape, whereupon a roller 353 mounted upon lever 338 engages an arm 354 of suitable well-known toggle means 355 and rocks the paper feed devices to open throat position, as illustrated in full line position of Figure 7.

*Special item posting routine*

Figure 12 illustrates one example of a posting routine involving the entry of not only normal items, such as described above, but also of a plurality of special deposit items, which items require that related entries be made in the "Delayed Credit" column. In order that the description be simplified, however, the normal item entries have been shown as identical to those previously described and are presumed, except as otherwise described, to be entered in the manner earlier described.

It will be recalled that the final normal deposit entry ($70.00) in the earlier described example was effected through means of a rearward movement of the Skip/Balance lever 201 (Fig. 2). This was to effect subsequent tabulation of the record carriage into the "New Balance" columnar position. In the present instance, however, the carriage is to remain in the "Deposit" position and said entry therefore at this time in lieu of operating lever 201 will be made by means of the operating key 114, as in the manner described for the first deposit entry ($30.00).

The first special check deposit item ($50.00) is to be entered in the "Deposit" column and thereafter printed in a "Delay Credit" column past the "New Balance" column position and said entry will therefore be made through a forward movement of Skip/Balance lever 201 as follows.

As in the known manner earlier described a forward movement of lever 201 will release lever 207 for counter-clockwise movement to position projection 211 of finger 210 above the lever 213 for controlling a subsequent release of the carriage escapement detent 7 (Fig. 5), following a machine cycle of operation. Also forward movement of lever 201 initiates a machine cycle of operation by depressing operating key 114, through bell crank lever 204. During said cycle of operation the $50.00 deposit item is entered in the registering devices and printed upon the "Deposit" column of the ledger sheet, and near the end of the operation pin 225 restores bell crank 207 and the link 210, thereby rocking levers 213, 212 to effect release of detent 7 from bar 1 of the carriage tabulating devices, all in the known manner earlier described. In the present instance, however, the previously described latch 358 for lever 213 serves to hold the detent 7 in depressed position so that the pin 240a earlier described is now rendered ineffective of stopping the record carriage at the "New Balance" position. The carriage therefore now continues in a tabulating movement until brought to rest, at the "Delay Credit" columnar position, in the manner hereinafter described.

Pivotally mounted at 360 (Fig. 6) upon transverse bar 195 of the carriage is a cam shoe 361 adapted for engaging and depressing a roller 362 in a tabulating movement only of the carriage, as said carriage moves into the "Delay Credit" columnar position. Roller 362 is mounted upon an arm 363 (Fig. 9) fast to one end of a sleeve 364 loosely mounted upon the transverse shaft 270 supported within the base structure of the machine. Fast to the other end of sleeve 364 is a forwardly extending arm 365 underlying the lower edge of a slide member 366, having suitable pin and slot support 367 upon the rear framing of the machine. The upper portion of slide 366 is bent forwardly to form a projection 366' underlying an arm 358' of the latch member 358 (Fig. 2) so that upon depression of roller 362 by cam shoe 361 slide 366 is caused to be moved upwardly by arm 365 and projection 366' engaging arm 358' releases latch 358 from the pin 357, and thereby unlock the balance key skip tabulating means 213—212 earlier described. Upon release of latch 358 a pin 240b (Fig. 5) suitably placed on tabulating bar 1 thereafter acts to trip the latch member 235, as described for pins 240, 240a, so that detent 7 now reengages with bar 1 to bring the carriage at rest in the "Delay Credit" columnar position.

During the above-described operations a control of the carriage return devices by the cam shoe 250 Fig. 6 is again rendered ineffective, through a disabling of the latch 328 Fig. 3 by the pin 209 of lever 207, as in the manner previously described.

The present posting routine involves a second special entry item ($35.00) in the "Deposit" column, and the delay credit entry of $50.00 related to the first special entry item is therefore at this time caused to be effected through means of a special operating key 368 which is adapted to control an operation of the carriage return means following the delay credit entry, as will now be described.

Operating key 368, as shown in Figure 3, is pivotally mounted at 369 to the machine framing and is provided with a pin 370 overlying the regular operating key 114 so that depression of key 368 acts to depress key 114 and initiate operation of the cyclic devices for the registering and printing of the $50.00 delay credit value previously set up on the keys 215. During the above operation of key 368 a downwardly extending arm 368' thereof engages a lug 371 of an arm 372 fast to the square shaft 199 and imparts a clockwise movement to said shaft. As earlier described, operation of shaft 199 will displace latch 328 for subsequent engagement by pin 331 and at the end of the cycle of operation said pin will effect operation of the carriage return clutch 334, whereby tape 336 imparts a return movement to the carriage. The carriage will now continue in a return operation until interrupted at the "Deposit" columnar position by means of the normally raised cam member 252 Fig. 6 earlier described engaging with roller 197 of arm 198 for restoring shaft 199 counterclockwise, to thereby disengage latch 328 from the pin 331 and disable the clutch means 334.

It will be noted that during the above return operation of the carriage by tape 336 the carriage front feed devices, shown in Figure 7, at this time are prevented from opening by an engagement of shoulder 343 with the projection 342 of latch 341. Also, that bail 187 at this time is free to move and effect an operation of the platen feed pawl 814 to cause a line spacing operation of the paper platen.

The second special deposit item $35.00 is now set up on keys 215 and is also caused to be registered and printed through forward operation of key 201 Fig. 2 in the same manner as set forth for the first special deposit entry $50.00, following which the carriage as described above again tabulates through the "New Balance" column and to the "Delay Credit" position.

The amount of $35.00 having been cleared from the keyboard in usual manner is now reset on digit keys 215, and the operator having noted that said amount represents a final deposit entry, following which a "New Balance" terminal operation is to be effected prior to returning the carriage to its initial "Old Balance" position, will effect an operation in the "Delay Credit" column at this time through means of the regular operating key 114. Following the printing of the final "Delay Credit" amount therefore the regular carriage tabulating operating finger 184 (Fig. 5) at this time effects release of detent 7 from bar 1 and the carriage thereupon starts to tabulate beyond the last columnar position, until stopped after a short off-column tabulating movement through engagement of detent 7 with a special notch 193' cut in the bar 1. Tabulation of the carriage to the above special position is adapted to bring certain control cams into effective position for controlling various special operations relative to returning the record carriage at this time to the "New Balance" columnar position, as will now be described.

As the carriage tabulates into the above off column position a cam member 373 (Fig. 6) on bar 195 will engage and depress roller 197 to thus condition latch 328 (Fig. 3) for a subsequent operation of the carriage return devices, as in the manner heretofore described for cam members 250 and 254. At the same time a cam member 374 on the bar 195 will engage and depress a roller 375 fast to a rearwardly extending arm 376 (Fig. 9) of a bail member 377 and imparts a clockwise movement to said bail. A forwardly extending arm 378 of bail 377 has link connection 379 (Fig. 2) with the lower end of a lever 380 fulcrumed at 381 to the right-hand frame of the machine and having engagement at the upper end thereof with a projection 382 (Fig. 3) of an arm 383 secured to a shaft 384 of the machine. Also secured to shaft 384 is a downwardly extending arm 385 having engagement with an upwardly extending arm 112' of the cyclic clutch release latch 112. Thus a clockwise movement of bail 377 by cam 374 will act, through link 379, lever 380, arms 383 and 385 to effect release of latch 112 from lever 106 to initiate at this time an automatic idle machine cycle of operation relative to registration and printing. At the end of this blank cycle of operation, however, pin 331 engages the activated latch member 328 and effects an operation of return clutch 334 to impart a return movement of the record carriage.

Pivotally mounted at 386 Fig. 6 upon bar 195, relative to the "New Balance" columnar position, is a cam shoe 387 normally held in a clockwise lowered position through means of a suitable pin and L slot connection 388 with tie rod 177. The cam 387 in downward position is thus held out of cooperation with roller 197 during the above-described shuttle movements of the record carriage between the "Deposit" and "Delay Credit" columnar positions. As the carriage shifts into the above-described final tabulated position, however, a cam shoe 389, pivoted at 390 upon bar 195, is carried toward the left and beyond the roller 197. Cam shoe 389 is normally held in a clockwise raised position, through pivotal connection 391 with tie rod 177 and as roller 197 is caused to be depressed by cam member 373 said roller will be positioned for subsequent engagement by cam surface 389' of cam shoe 389 in a return movement of the carriage. Engagement of cam surface 389' with roller 197 acts to impart a counterclockwise movement to the cam shoe 389 and thereby imparts leftward movement to tie rod 177 to thus raise and lock cam shoe 387 in a counterclockwise setting. In raised position cam 387 thereafter will act to engage and restore roller 197 to raised position and thereby interrupt a return movement of the carriage relative to the "New Balance" columnar position.

It is recalled that a leftward movement of tie rod 177 also controls a release of the front feed devices, illustrated in Figure 7, for automatically opening the carriage by means of return tape 336, following the "New Balance" operation in a normal posting routine. In the present instance, however, the front feed devices are to be prevented from opening during operation of return tape 336 until after a "New Balance" terminal operation is completed, as will now be described.

For a normal posting routine it will be remembered that a leftward operation of tie rod 177 was effected by means of lever 66, which lever was operated during the "New Balance" terminal cycle of operation prior to the related operation of the carriage return devices.

In the present instance, however, cams 373, 374 will effect a return movement of tape 336 prior to the engagement of cam surface 389' with roller 197. Thus tape 336 now acts to rock lever 338 together with finger 344 downwardly in time for shoulder 343 to engage with lug 342 of latch 341 and exert friction thereon prior to the leftward movement of tie rod 177 by the cam 389'. Shoulder 343 at this time therefore will prevent release of latch 341 by tie rod 177, and the carriage remains in closed position. In the above operation tie rod 177 is free to move idly with respect to latch 341 through means of the yieldable spring connection 352 between said latch and the bell crank member 349.

Upon restoral of roller 197 to a raised position by the engagement thereof with adjusted cam shoe 387, as the carriage returns to the "New Balance" position described above, tape 336 will release arm 338 and a suitable spring 347 connected thereto will raise said arm and finger 344, to release frictional engagement of shoulder 343 with projection 342. Upon release of shoulder 343 from projection 342 latch 341 is rocked counterclockwise by spring 352 so that thereafter the carriage opening devices will be free to operate, following a subsequent "New Balance" terminal posting operation.

It is desirable that the "New Balance" amount be printed along the same line with that of the final deposit and delay credit item. Special means therefore are provided for disabling operation of the line spacing devices at this time.

With reference to Figure 9, loosely mounted upon sleeve 364 supported upon shaft 270 is a bail 392 having a rearwardly extending arm 393 upon which is mounted a roller 394. Fast upon bar 195 of the carriage is a cam 395 adapted upon a tabulation of the carriage to the above-described off-column position to engage roller 394 and rock bail 392 in a clockwise direction. Bail 392 is provided with a forwardly extending arm 396 embraced by a suitable slot in a slide member 397, supported for slidable movement upon the rear framing of the machine at 398. The upper end of slide 397 has a cam projection 399 extending beneath the lever 258 adapted for controlling operation of the line space bail 187, as earlier described. During the above-described clockwise operation of bail 392 arm 396 will raise slide 397 and projection 399 cams lever 258 counterclockwise and, through pivotal connection with lever 262, positions the projection 265 beneath bail 187, to thus prevent an operation of said bail and thereby disable the well-known line space means, as in the manner previously described.

Following an interruption of the return movement of the carriage relative to the "New Balance" position, through raising of roller 197 Fig. 6 by the adjusted cam 387, the cam member 254 earlier described will immediately redepress roller 197 and again condition latch 328 Fig. 3 for a carriage return operation, while cam 267 initiates an automatic total taking cycle of operation to effect a printing of the "New Balance" total. During the printing of the "New Balance" total, pin 331 will thus engage latch 328 to again effect operation of the carriage return means and lock 341 (Fig. 7) now being free of shoulder 343, as previously described, tape 336 will at this time also effect an opening of the front feed devices, as in the manner earlier described.

It will be observed that the above-described leftward movement of tie rod 177 by cam 289' not only raises the cam member 387 to interrupt return movement of the carriage at the "New Balance" columnar position but will also rock cam members 252 and 196 downwardly whereby said cams will be free of roller 197 in the subsequent return movement of the carriage to the first or "Old Balance" columnar position. Also in said movement of rod 177 cam shoe 179 is rocked upwardly for subsequent engagement with roller 197 to restore rod 177 and the cams controlled thereby to their normal setting, upon movement of the carriage into the "Old Balance" position, and the machine is now in condition for further normal or special posting routine operations.

Having now described improved and extremely simple devices for effecting posting routine operations in a listing calculating machine, what I claim is:

1. In a machine of the class described the combination comprising registering and printing means, cyclic operating devices, a traveling record carriage movable to a plurality of columnar positions, a power means for effecting return movement of the record carriage, control means for effecting an operation of said return means, settable means positioned on the record carriage relative to a selective columnar position and normally set for cooperation with said return control means in a return movement of the carriage to automatically disable the power return means and interrupt said return movement of the carriage, a member movable by the cyclic operating devices, operating means cooperable therewith and normally ineffective of said movement, means on the record carriage relative to a second selective tabulated position thereof and adapted upon a movement of said carriage to said second selective columnar position to adjust the said operating means to an effective position for a subsequent movement by said member, and devices on the record carriage cooperable with said interrupting means and rendered effective in a movement of the record carriage to the said later columnar position for an operation in the said movement of said operating means to thereby automatically adjust the said return interrupting means to an ineffective position.

2. The invention in accordance with claim 1 and having a throat opening paper support means on the carriage adapted for adjustment from closed to open throat position through operation of the carriage return means, latch means for normally blocking an operation of said throat opening means during return movement of the carriage, and means operable in said adjustment of the interrupting means to ineffective position to disable said latch means in such a way that an operation of the carriage return means in returning the carriage from the said second selective columnar position will also effect an operation of the said paper support means to open throat position.

3. The invention in accordance with claim 2 and including a lever having yieldable spring connection with the said latch means, a cam means on the record carriage adapted for effecting an adjustment of the return control means to cause an automatic return movement of the carriage relative to a tabulated position subsequent to the second said selective columnar position, a cam means on the record carriage provided with a tie rod connection to said lever and adapted for cooperation with the said adjusted control means to effect a movement of said lever following a first increment of carriage return movement from said subsequent tabulated position, and wherein during said increment of return movement the carriage throat opening means is caused to be moved into frictional engagement with the said latch means for the purpose of preventing an operation of said latch means during said operation of said yieldable connection and thereby disabling operation of the throat opening means in a return movement of said carriage incident to machine operations relative to the said subsequent tabulated carriage position.

4. The invention in accordance with claim 3 and including a cam member pivoted upon the record carriage relative to the said second selective columnar position and normally in an ineffective position of cooperation with the said adjusted return control means, and wherein the said cam member is adapted for adjustment by the said movement of said tie rod to a position of cooperation with the said adjusted return control means to restore said means and interrupt a return movement of the carriage relative to the said second selective columnar position, and wherein said interruption of the return means acts to release the said frictional engagement of the carriage opening means with the said latch means to effect a movement of said latch means by the said spring connected lever out of blocking relation with the said carriage opening means so that an automatic operation of the carriage opening means may be effected in a subsequent operation of the carriage return means.

5. The invention in accordance with claim 4 and wherein the said movement of the tie rod will act also to simultaneously move to ineffective position the said normally set means related to the first named selective columnar position whereby a return movement of the carriage from the said second named selective columnar position will continue uninterrupted past said first named selective columnar position.

6. In a machine of the class described the combination comprising registering and printing means, cyclic operating devices, a traveling record carriage movable to a plurality of columnar positions, a power means for returning the record carriage, control means for effecting an operation of said power return means, settable means on the carriage normally cooperable with the said return control means in a return movement of the carriage for disabling said power return means and automatically interrupting a return movement of the carriage relative to a selective columnar position, totalizing means for the registers, control devices for effecting an operation of said totalizing means, a cam means on the record carriage cooperable with said control means and adapted in a tabulated position of the record carriage subsequent to the said selective columnar position to adjust said control means and effect an automatic totalizing operation of the cyclic operating means, a driver movable in an operation of the cyclic operating devices, devices adapted to be driven thereby and normally ineffective of a movement of said driver, means under control of the said control devices effecting said automatic totalizing operation of the cyclic devices to condition the said ineffective means for an operation by said driver, and wherein movement of the record carriage to the later said columnar position will bring the said return interrupting means into cooperative position for an operation by the said driven means and thereby effect an automatic adjustment of the said interrupting means to an ineffective position.

7. In a machine of the class described the combination comprising registering means, printing means, cyclic operating devices therefor, a base structure, a shiftable record carriage supported thereon, tabulating means for moving the carriage to a plurality of columnar positions, power means for effecting return movements of the record carriage, a control arm operable to effect operation of the power return means, an adjustable cam member pivoted upon the record carriage and normally in a position for cooperation with said operated control arm in such a way that upon return movement of the carriage said cam member acts to restore said operated arm to thereby disable the power return means and thus normally interrupt return movements of the carriage, a bell crank pivoted upon the shiftable record carriage and having connection with said cam member, an operating member for said bell crank mounted within the base structure and cooperable with said bell crank in a given position of the carriage, an arm movable in an operation of the cyclic operating devices, a drive link having connection with said operating member and normally ineffective of a movement of said movable arm, and means on the record carriage in relation to the said given position thereof and adapted for adjusting the said link to an active position for operation by said movable arm to thereby effect an automatic adjustment of the said carriage return interrupting cam to an inactive position.

8. In a machine of the class described, the combination comprising registering and printing means, cyclic operating devices, a traveling record carriage movable to a plurality of columnar positions from a starting columnar position to a terminal operation columnar position from which the carriage is to be returned to said starting position, means for effecting an operation of the cyclic operating devices with the carriage in said terminal operation position, power operated return means for the carriage including a clutch engageable in an operation of the cyclic devices, devices under control of the carriage for effecting an automatic operation of the return means following said terminal operation of the cyclic devices; settable control devices normally conditioned to normalize said clutch means and thereby interrupt return movements of the record carriage relative to selective columnar positions intermediate said terminal and said starting columnar positions, an operating member movable by the cyclic devices, settable means normally held free of a movement of said member, means operable upon a movement of the record carriage to the said terminal operation position for adjusting the said settable means to an effective position for subsequent movement by the said operating member, and means conditioned upon movement of the record carriage into the said terminal operation position and operable thereafter by said subsequent movement of the adjusted means for displacing the said settable control devices to ineffective position and thereby permitting an uninterrupted return movement of the record carriage.

9. In a machine of the class described, the combination comprising registering and printing means, cyclic operating devices, a traveling record carriage movable to a plurality of columnar positions from a starting columnar position to a terminal operation columnar position from which the carriage is to be returned to said starting position, means on said carriage adapted for effecting an automatic operation of the cyclic devices upon a movement of the carriage to the said terminal operation position, power operated carriage return means, control means for said power return means, devices on the carriage adapted to effect an automatic operation of the said return control means and cause a return movement of the carriage following said operation of the cyclic devices; a settable control member fulcrumed upon the record carriage and related to a selective columnar position intermediate the said terminal and said starting columnar position, means for retaining said member in a set position to interrupt operation of the carriage return means for the purpose of normally interrupting return movements of the carriage relative to said selective columnar position, driving means operable by a movement of the cyclic devices, driven means normally ineffective of said movement of the driving means, control means adapted upon movement of the record carriage into said terminal operation position to adjust the said ineffective means to active condition for subsequent operation by the said driving means, and a means conditioned upon movement of the carriage to the said terminal operation position for an operation by the said driven means during the said automatic operation of the cyclic devices to set said control member to ineffective position and thus permit uninterrupted return movement of the record carriage from said terminal to said starting columnar position.

10. In a machine of the class described, the combination comprising registering and printing means, cyclic operating devices, a traveling record carriage movable to a plurality of columnar positions from a starting columnar position to a terminal operation columnar position from which the carriage is to be returned to said starting position, means on said carriage adapted for effecting an automatic operation of the cyclic devices upon a movement of the carriage to the said terminal operation position, power operated carriage return means, control means for said power return means, devices on the carriage adapted to effect an automatic operation of the said return control means and cause a return movement of the carriage following said operation of the cyclic devices; a settable cam member pivoted upon the record carriage and normally in set position for engaging the said operated return control means during return movements of the carriage to automatically restore said means and thereby stop a return movement of the carriage relative to a selective columnar position intermediate the said terminal and the said starting columnar positions, a lever fulcrumed on the record carriage and having operating connection with the said cam member, an operating means for said lever adapted to be rendered effective for cooperation therewith upon a movement of the record carriage to the said terminal operation columnar position, a member adapted for reciprocatory movement by the cyclic operating devices, means normally ineffective of an operation of said reciprocatory member, and cam means on the record carriage adapted in a movement of said carriage to the said terminal operation columnar position to render the said normally ineffective means active relative to said reciprocatory member in such a way that an operation of said member in a subsequent operation of the cyclic devices will effect an operation of the normally ineffective means and cause an operation of the said lever and thereby move the said cam member to a position ineffective of the operated return control means, whereupon the carriage will continue a return movement without interruption to the said starting columnar position.

11. The invention according to claim 8 and having carriage open throat paper support means including carriage opening devices for moving said paper support means from a closed to open throat position in an operation of the power return means, a latch means adapted for normally preventing an operation of said carriage opening devices during operations of the return means, and means operable by an operation of the said means which render the interrupting means ineffective to also disable said latch means and thereby effect an automatic operation of the open throat means in a return movement of the carriage from said terminal operation columnar position to said starting columnar position.

12. The invention in accordance with claim 11 and including means operable upon a return movement of the record carriage into the said starting columnar position for restoring the said carriage return interrupting means and the said carriage opening preventing means to their respective normal effective positions adapted for interrupting subsequent return movements of the record carriage and for preventing operation of the carriage opening means during said return movements.

13. In a machine of the class described, the combination comprising registering and printing means, cyclic operating devices, control means for initiating an operation of said cyclic devices, a traveling record carriage, tabulating means normally releasable in operations of the cyclic devices for moving the record carriage to successive columnar positions, power means including a clutch engageable in an operation of the cyclic devices for effecting a return movement of the record carriage, line space means operable by and normally ineffective of an operation of the cyclic devices, a control means in common to the tabulating and line space and return means, a means on the record carriage adapted in a selective columnar position thereof for adjusting the said common control means in such a way that during operations of the cyclic devices with the carriage in said selective columnar position the said tabulating means is caused to be disabled while automatic operation of the line space means and of the said return means is caused to be effected, and a settable control member supported upon the record carriage relative to the said selective columnar position and normally in set condition for restoring the said common control means to interrupt the return movement of the carriage following said line spacing operation and to enable the tabulating means thereafter to relocate the carriage in said selective columnar position.

14. The invention in accordance with claim 13 including an auxiliary means for effecting an operation of the tabulating means and normally ineffective of an operation of the cyclic devices, control means therefor including a manually operable member adapted for initiating an operation of the cyclic devices and for rendering the said auxiliary means effective for releasing the tabulating means in said cycle of operation so that the record carriage is tabulated to a subsequent columnar position, a means yieldably operable by the cyclic devices and adapted for effecting an operation of the line space means, and means settable in an operation of the said manually operable member for disabling an operation of said yieldable means and thereby preventing an operation of the said line space means during said operation of the cyclic devices.

15. The invention according to claim 14 and having totalizing means operable in an operation of the cyclic operating devices, control means on the record carriage adapted in said tabulation of the carriage to the said subsequent columnar position to effect an automatic totalizing operation of the cyclic operating devices, a control means on the carriage related to the said subsequent columnar position and adapted to adjust the said common control means so as to effect an automatic operation of the carriage return means following the said totalizing operation of the cyclic devices, a drive member movable by the cyclic devices, means adapted to be driven by said drive member and normally ineffective of an operation of said drive member, means operable by the automatic totalizing control means to adjust the said normally ineffective means for an operation by the said drive member during said totalizing operation of the cyclic operating devices, devices on the record carriage having connection with the said normally set carriage return interrupting means and adapted to be brought into cooperative relation with the said driven means upon a movement of the record carriage into the said subsequent columnar position and operable thereafter by the said driven means for adjusting the said interrupting means to an ineffective position and thereby allow return movement of the carriage past said selective columnar position.

16. The invention according to claim 15 and including an open throat paper support means on the carriage, means for adjusting said open throat means to open position in an operation of the power return means, a means normally adapted to prevent said operation of the paper support means, and means operable by the said devices on the record carriage in adjusting the carriage return interrupting means to said ineffective position to also release said preventing means and effect an automatic opening of the paper support means during the return movement of the carriage.

17. The invention according to claim 16 and including means operable by a return movement of the carriage into a starting tabulating position preceding the said selective columnar position to restore the carriage return interrupting means and the said means for preventing opening of the paper support to their normal effective conditions.

18. In a machine of the class described the combination comprising registering and printing means, cyclic operating devices, means including a manually operable member for initiating operations of said cyclic devices, a traveling record carriage, tabulating means releasable in an operation of the cyclic devices for positioning the record carriage to a plurality of columnar positions, power means operable independently of the cyclic devices upon a movement of the record carriage into tabulated position and adapted to effect a program control of the registering means, totalizing devices, control means for effecting an operation of said totalizing devices including means conditioned normally ineffective of operations of the said independent power means, means adapted by movement of the record carriage to a selective columnar position for conditioning said ineffective means for a subsequent operation by the said independent power means to effect an automatic totalizing operation of the cyclic devices, a power means for returning the record carriage, an operation control means for said power return means normally conditioned ineffective of an operation of the cyclic operating devices, a control member supported upon the record carriage relative to the said selective columnar position and adapted for adjusting the said operation control means to an effective position for an operation by the cyclic devices during the said automatic totalizing operation effected with the carriage in said selective columnar position so that an automatic operation of the power return means is effected following the said totalizing operation, skip column tabulating control devices including a second manually operable member for effecting operation of the cyclic devices and for controlling skip tabulation of the record carriage past said selective columnar position in an inactive manner relative to the said automatically controlled operations related to the said selective columnar position and including means for thereafter normalizing the skip tabulating means in a movement of the carriage to a columnar position following the said selective columnar position, a third manually operable member for thereafter effecting an operation of the cyclic devices and wherein said member is adapted to condition the said inactive devices of the power return control means whereby said operation of the cyclic devices will effect an operation of the power return means, and a settable cam member on the record carriage normally conditioned to subsequently disable said operation of the power return means and automatically interrupt return movement of the carriage in a tabulated columnar position which precedes the said selective tabulated columnar position.

19. The invention in accordance with claim 18 and having line space devices including means yieldably operated by the cyclic devices, a blocking member normally adapted for engagement by the said yieldable means for the purpose of preventing a line space operation during operations of the cyclic operating devices, means operable by the said control means which effect operation of the said power return means to also adjust the said blocking means to an ineffective position in such a way that a line spacing operation is caused to be effected in an operation of the cyclic devices as initiated upon operation of the said third manually operable member in effecting said operation of the power return means, and wherein the said normally conditioned means adapted for automatically interrupting the said return movement of the record carriage will act also to automatically restore the said blocking means to the normal line space preventing condition.

20. The invention in accordance with claim 19 and wherein a selective operation of the first named manually operable member in lieu of said operation of said third manual control member in effecting an operation of the cyclic devices will cause tabulation of the record carriage to an off column position, and including a cam member on the carriage adapted in said off column position for effecting an adjustment of the power return control means to a return control position and in so doing to also adjust the said line space blocking means to an ineffective condition, supplemental operating control means for the cyclic devices, a cam member on the carriage cooperable with said supplemental control means in said off column position of the carriage to effect an automatic cycle of operation of the said cyclic devices and thus effect a subsequent operation of the power return means, auxiliary control devices for the line space means, a cam means on the carriage cooperable with said auxiliary control devices in said off position of the carriage for adjusting the said devices to block an operation of the line space means during said operation of the cyclic devices.

21. The invention in accordance with claim 18 and having throat opening paper support means on the carriage, means operable in an operation of the carriage return means for effecting an operation of the said paper support means to an open throat position, and a latch means spring held into a position for blocking an opening operation of the said paper support means in the said return movement of the record carriage as effected under control of the said third manually operable member.

22. The invention in accordance with claim 18 and wherein a selective operation of the first named manually operable member in lieu of the said operation of said third manual control member in effecting an operation of the cyclic devices will cause a tabulation of the record carriage to an off column position, and including a cam member on the carriage adapted in said off column position to effect adjustment of the power return control means to the return control position, supplemental operating control means for the cyclic devices including means operable in a movement of the carriage to the said off columnar position to effect an automatic operation of the cyclic devices and wherein said cycle of operation thereupon effects a subsequent operation of the power return means, a cam shoe mounted upon the record carriage for pivotal operation by engagement thereof with the adjusted return control means following a partial return movement of the record carriage from the said off column position, a second cam shoe pivoted upon the record carriage and related to the said selective columnar position, means interconnecting said cam shoes whereby said operation of said first cam shoe will adjust the said second cam shoe for subsequent engagement with the said adjusted return control means and interrupt said return movement of the carriage at the said selective columnar position.

23. The invention in accordance with claim 22 and having throat opening paper support means on the record carriage, means operable by an operation of the carriage return means for effecting operations of the said paper support means to an open throat position, devices adapted for engagement with the throat opening means for preventing an operation thereof during an operation of the return means including a spring tensioned first member having yieldable spring connection with a second member and adapted for holding said second member in a position to be engaged by the throat opening means in a movement toward throat opening position, and wherein the said partial return operation of the record carriage acts to effect a frictional engagement of the throat opening means with the said second member and thereby disables operation of the opening means prior to the said operation of the interconnecting means for the cam shoes, and wherein said operation of the said interconnecting means is adapted to thereafter effect a displacement of the said first spring tensioned member and thereby effect a spring tension to the said frictionally held second member.

24. The invention in accordance with claim 23 and wherein the said interruption of the return movement of the record carriage relative to the said selective columnar position will effect a release of the said frictional engagement of the carriage opening means from the said second spring tensioned member and thereby effect a displacement of said second member out of cooperation with the carriage opening means so that a subsequent operation of the carriage return means in effecting a further return movement of the carriage will act also to effect operation of the paper support means to open throat position.

References Cited in the file of this patent

UNITED STATES PATENTS

| | | |
|---|---|---|
| 2,291,154 | Fettig | July 28, 1942 |
| 2,442,402 | Davidson | June 1, 1948 |
| 2,561,552 | Anderson | July 24, 1951 |